(12) United States Patent
Jang et al.

(10) Patent No.: US 11,141,034 B2
(45) Date of Patent: Oct. 12, 2021

(54) CLEANER

(71) Applicant: LG ELECTRONICS INC., Seoul (KR)

(72) Inventors: Jaewon Jang, Seoul (KR); Youngkouk Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 16/333,147

(22) PCT Filed: Jul. 14, 2017

(86) PCT No.: PCT/KR2017/007560
§ 371 (c)(1),
(2) Date: Mar. 13, 2019

(87) PCT Pub. No.: WO2018/012921
PCT Pub. Date: Jan. 18, 2018

(65) Prior Publication Data
US 2019/0223676 A1    Jul. 25, 2019

Related U.S. Application Data

(60) Provisional application No. 62/362,358, filed on Jul. 14, 2016.

(30) Foreign Application Priority Data

Jan. 19, 2017    (KR) .................. 10-2017-0009364

(51) Int. Cl.
*A47L 11/14*    (2006.01)
*A47L 11/282*    (2006.01)
(Continued)

(52) U.S. Cl.
CPC ............. *A47L 11/283* (2013.01); *A47L 9/009* (2013.01); *A47L 9/0606* (2013.01);
(Continued)

(58) Field of Classification Search
CPC ........ A47L 11/14; A47L 11/145; A47L 11/20; A47L 11/201; A47L 11/282;
(Continued)

(56) References Cited

U.S. PATENT DOCUMENTS 3,381,334 A    5/1968    Redmond
3,827,099 A    8/1974    Allaire et al.
(Continued)

FOREIGN PATENT DOCUMENTS

CN    1568156    1/2005
CN    1721815    1/2006
(Continued)

OTHER PUBLICATIONS

PCT Search Report dated Nov. 20, 2017, on PCT International Patent Application No. PCT/KR2017/007551.
(Continued)

*Primary Examiner* — Randall E Chin
(74) *Attorney, Agent, or Firm* — Finnegan, Henderson, Farabow, Garrett & Dunner, LLP

(57) ABSTRACT

A cleaner includes a first cleaning module including a left spin mop and a right spin mop configured to contact the floor while rotating in a clockwise direction or in a counterclockwise direction when viewed from an upper side, a second cleaning module configured to contact the floor in front of the first cleaning module, and a body supported by the first cleaning module and the second cleaning module. A point on the bottom surface of the left spin mop that receives the largest frictional force from the floor is located on a left-front side of the rotation center of the left spin mop, and a (Continued)

point on the bottom surface of the right spin mop that receives the largest frictional force from the floor is located on a right-front side of the rotation center of the right spin mop.

14 Claims, 13 Drawing Sheets

(51) Int. Cl.

| | |
|---|---|
| *A47L 11/40* | (2006.01) |
| *A47L 11/283* | (2006.01) |
| *A47L 11/293* | (2006.01) |
| *B08B 3/04* | (2006.01) |
| *B08B 3/08* | (2006.01) |
| *A47L 11/292* | (2006.01) |
| *A47L 11/16* | (2006.01) |
| *A47L 11/34* | (2006.01) |
| *B25J 9/16* | (2006.01) |
| *B25J 11/00* | (2006.01) |
| *G05D 1/02* | (2020.01) |
| *A47L 9/00* | (2006.01) |
| *A47L 9/06* | (2006.01) |
| *A47L 11/20* | (2006.01) |
| *B25J 5/00* | (2006.01) |
| *B25J 9/00* | (2006.01) |
| *B25J 9/12* | (2006.01) |
| *A47L 13/20* | (2006.01) |
| *B08B 1/04* | (2006.01) |
| *A47L 9/28* | (2006.01) |
| *A47L 11/24* | (2006.01) |

(52) U.S. Cl.
CPC ........... *A47L 9/2826* (2013.01); *A47L 9/2852* (2013.01); *A47L 11/14* (2013.01); *A47L 11/16* (2013.01); *A47L 11/161* (2013.01); *A47L 11/20* (2013.01); *A47L 11/201* (2013.01); *A47L 11/24* (2013.01); *A47L 11/282* (2013.01); *A47L 11/292* (2013.01); *A47L 11/293* (2013.01); *A47L 11/34* (2013.01); *A47L 11/40* (2013.01); *A47L 11/4002* (2013.01); *A47L 11/4005* (2013.01); *A47L 11/405* (2013.01); *A47L 11/408* (2013.01); *A47L 11/4011* (2013.01); *A47L 11/4013* (2013.01); *A47L 11/4038* (2013.01); *A47L 11/4058* (2013.01); *A47L 11/4061* (2013.01); *A47L 11/4066* (2013.01); *A47L 11/4069* (2013.01); *A47L 11/4072* (2013.01); *A47L 11/4083* (2013.01); *A47L 11/4088* (2013.01); *A47L 13/20* (2013.01); *B08B 1/04* (2013.01); *B08B 3/041* (2013.01); *B08B 3/08* (2013.01); *B25J 5/007* (2013.01); *B25J 9/0003* (2013.01); *B25J 9/126* (2013.01); *B25J 9/1664* (2013.01); *B25J 9/1666* (2013.01); *B25J 11/0085* (2013.01); *G05D 1/0223* (2013.01); *A47L 11/145* (2013.01); *A47L 2201/00* (2013.01); *A47L 2201/04* (2013.01); *A47L 2201/06* (2013.01); *G05D 2201/0203* (2013.01)

(58) Field of Classification Search
CPC .... A47L 11/292; A47L 11/40; A47L 11/4013; A47L 11/4038; A47L 11/4066; A47L 11/4069; A47L 11/408; A47L 11/4083; B25J 11/0085
See application file for complete search history.

(56) References Cited

U.S. PATENT DOCUMENTS

| | | |
|---|---|---|
| 4,418,342 A | 11/1983 | Aschoff et al. |
| 5,991,951 A | 11/1999 | Kubo et al. |
| 6,493,896 B1 | 12/2002 | Stuchlik et al. |
| 7,320,149 B1 | 1/2008 | Huffman et al. |
| 9,814,364 B1 | 11/2017 | Caruso |
| 2004/0163199 A1 | 8/2004 | Hsu |
| 2004/0221474 A1 | 11/2004 | Slutsky et al. |
| 2005/0015913 A1 | 1/2005 | Kim et al. |
| 2005/0166356 A1 | 8/2005 | Uehigashi |
| 2005/0183230 A1 | 8/2005 | Uehigashi |
| 2006/0185690 A1* | 8/2006 | Song ................. A47L 11/34 134/21 |
| 2007/0261715 A1 | 11/2007 | Lee et al. |
| 2010/0031463 A1 | 2/2010 | Adams et al. |
| 2012/0084938 A1 | 4/2012 | Fu |
| 2012/0125363 A1 | 5/2012 | Kim et al. |
| 2013/0096717 A1 | 4/2013 | Yoon et al. |
| 2013/0263889 A1 | 10/2013 | Yoon et al. |
| 2014/0130289 A1 | 5/2014 | Hyun et al. |
| 2014/0209122 A1 | 7/2014 | Jung et al. |
| 2015/0142169 A1 | 5/2015 | Kim et al. |
| 2015/0143646 A1 | 5/2015 | Jeong et al. |
| 2015/0150429 A1 | 6/2015 | Yoo et al. |
| 2015/0182090 A1 | 7/2015 | Park et al. |
| 2015/0196183 A1 | 7/2015 | Clark et al. |
| 2015/0342431 A1* | 12/2015 | Zydek ............... A47L 9/0477 15/366 |
| 2016/0022109 A1 | 1/2016 | Dooley et al. |
| 2016/0051108 A1 | 2/2016 | Huang et al. |
| 2018/0120833 A1 | 5/2018 | Lindhe et al. |
| 2019/0270124 A1 | 9/2019 | Jang et al. |

FOREIGN PATENT DOCUMENTS

| | | |
|---|---|---|
| CN | 1823677 | 8/2006 |
| CN | 2817718 U | 9/2006 |
| CN | 101267759 A | 9/2008 |
| CN | 101305893 A | 11/2008 |
| CN | 101313829 | 4/2012 |
| CN | 202341952 U | 7/2012 |
| CN | 102652654 | 9/2012 |
| CN | 103006153 | 4/2013 |
| CN | 203113255 U | 8/2013 |
| CN | 203296009 U | 11/2013 |
| CN | 103717117 A | 4/2014 |
| CN | 104244794 A | 12/2014 |
| CN | 104337469 | 2/2015 |
| CN | 104918529 A | 5/2015 |
| CN | 104757906 | 7/2015 |
| CN | 105744874 | 7/2016 |
| CN | 205411088 U | 8/2016 |
| EP | 2702918 A1 | 3/2014 |
| EP | 2762051 A2 | 8/2014 |
| EP | 2 888 980 A1 * | 7/2015 |
| EP | 3485785 | 5/2019 |
| JP | H03123522 | 5/1991 |
| JP | H05-300860 | 11/1993 |
| JP | H11-178764 | 7/1999 |
| JP | 2000-051128 | 2/2000 |
| JP | 2000070203 A | 3/2000 |
| JP | 2005-006816 | 1/2005 |
| JP | 2009-056216 | 3/2009 |
| JP | 2014-045898 | 3/2014 |
| KR | 20-0195057 | 9/2000 |
| KR | 10-2002-0074985 | 10/2002 |
| KR | 10-2005-0012047 | 1/2005 |
| KR | 10-2005-0014652 | 2/2005 |
| KR | 20-0412179 U | 3/2006 |
| KR | 20-0413777 | 4/2006 |
| KR | 10-2006-0094374 | 8/2006 |
| KR | 10-0669889 | 1/2007 |
| KR | 20-0435111 U | 1/2007 |
| KR | 10-0822785 | 4/2008 |
| KR | 10-2009-0026031 | 3/2009 |

(56) References Cited

FOREIGN PATENT DOCUMENTS

| KR | 10-2009008665 | 8/2009 |
|---|---|---|
| KR | 10-2009-0119638 | 11/2009 |
| KR | 10-2010-006151 | 1/2010 |
| KR | 20-2010-0001717 U | 2/2010 |
| KR | 10-0962121 | 6/2010 |
| KR | 10-0985376 | 10/2010 |
| KR | 10-2010-0133870 | 12/2010 |
| KR | 10-1000178 | 12/2010 |
| KR | 10-2011-0105305 | 9/2011 |
| KR | 10-1073102 | 11/2011 |
| KR | 20-0458863 | 3/2012 |
| KR | 20-2012-0002399 U | 4/2012 |
| KR | 10-2012-0042391 | 5/2012 |
| KR | 10-2012-0055891 | 6/2012 |
| KR | 10-2012-0100682 | 9/2012 |
| KR | 10-2013004242 | 4/2013 |
| KR | 10-1303159 | 9/2013 |
| KR | 10-2013-0129059 | 11/2013 |
| KR | 10-2014002247 | 2/2014 |
| KR | 10-2015-0014351 | 2/2015 |
| KR | 10-2015-0022133 | 3/2015 |
| KR | 10-2015-0031821 | 3/2015 |
| KR | 10-2015-0048490 | 5/2015 |
| KR | 10-2015-0057959 | 5/2015 |
| KR | 10-1522177 | 5/2015 |
| KR | 10-2015-0060030 | 6/2015 |
| KR | 10-2015007809 | 7/2015 |
| KR | 10-2015-0107396 | 9/2015 |
| KR | 10-2015-0107693 | 9/2015 |
| KR | 10-2015010769 | 9/2015 |
| KR | 10-2015-0116311 | 10/2015 |
| KR | 10-1569058 | 11/2015 |
| KR | 10-2015-0139111 | 12/2015 |
| KR | 10-1578887 | 12/2015 |
| KR | 10-1595727 | 2/2016 |
| KR | 10-2016003361 | 3/2016 |
| KR | 10-2016-0090570 | 8/2016 |
| KR | 10-2016-0104429 | 9/2016 |
| KR | 10-2016-0122520 | 10/2016 |
| KR | 10-1678443 | 12/2016 |
| KR | 10-2018-0105109 | 9/2018 |
| TW | 537326 U | 6/2003 |
| TW | M455464 | 6/2013 |
| WO | WO 2015/186944 A1 | 12/2015 |
| WO | WO 2016/027957 | 2/2016 |
| WO | WO 2016/036183 A1 | 3/2016 |

OTHER PUBLICATIONS

European Search Report dated Mar. 31, 2020, on European Patent Application No. 17827982.4.
European Search Report dated Apr. 2, 2020, on European Patent Application No. 17827992.3.
U.S. Office Action dated May 22, 2020, on U.S. Appl. No. 16/333,098.
U.S. Office Action dated May 6, 2020, on U.S. Appl. No. 16/333,144.
Taiwan Office Action dated Oct. 30, 2018, on Taiwan Patent Application No. 107101299.
Korean Office Action dated Apr. 23, 2020, on Korean Patent Application No. 10-2018-7036043.
Korean Notice of Allowance dated Apr. 28, 2020, on Korean Patent Application No. 10-2018-7036042.
Korean Notice of Allowance dated Apr. 29, 2020, on Korean Patent Application No. 10-2018-7036039.
Chinese Office Action dated Sep. 21, 2020 on Chinese Patent Application No. 201780056578.0.
EP Search Report dated Aug. 14, 2020.
U.S. Office Action dated Sep. 21, 2020 on U.S. Appl. No. 16/333,138.
U.S. Office Action dated Oct. 6, 2020 on U.S. Appl. No. 16/333,124.
U.S. Office Action dated Oct. 9, 2020 on U.S. Appl. No. 16/333,135.
PCT Search Report dated Sep. 28, 2017, on PCT International Patent appl. No. PCT/KR2017/007549.
PCT Search Report dated Nov. 20, 2017, on PCT International Patent appl. No. PCT/KR2017/007555.
PCT Search Report dated Nov. 20, 2017, on PCT International Patent appl. No. PCT/KR2017/007552.
PCT Search Report dated Nov. 20, 2017, on PCT International Patent appl. No. PCT/KR2017/007550.
PCT Search Report dated Nov. 23, 2017, on PCT International Patent appl. No. PCT/KR2017/007561.
PCT Search Report dated Nov. 23, 2017, on PCT International Patent appl. No. PCT/KR2017/007557.
PCT Search Report dated Nov. 23, 2017, on PCT International Patent appl. No. PCT/KR2017/007560.
PCT Search Report dated Nov. 23, 2017, on PCT International Patent appl. No. PCT/KR2017/007562.
Taiwan Office Action dated Dec. 18, 2018, on Taiwan Patent appl. No. 107101303.
Taiwan Office Action dated Dec. 25, 2018, on Taiwan Patent appl. No. 107101297.
Taiwan Office Action dated Sep. 18, 2019, on Taiwan Patent appl. No. 107101298.
Korean Notice of Allowance dated Jun. 17, 2019, on Korean Patent appl. No. 10-2018-0110855.
Korean Notice of Allowance dated Jun. 29, 2018, on Korean Patent appl. No. 10-2017-0009364.
Australian Office Action dated Jul. 16, 2019, on Australian Patent appl. No. 2017297104.
Korean Notice of Allowance dated Jun. 29, 2018, on Korean Patent Application No. 10-2017-0009364.
Korean Notice of Allowance dated Jun. 17, 2019, on Korean Patent Application No. 10-2018-0110855.
Taiwan Office Action dated Dec. 24, 2018, on Taiwan Patent Application No. 107101298.
Taiwan Office Action dated May 22, 2020, on Taiwan Patent Application No. 107101298.
European Search Report dated May 26, 2020, on European Patent Application No. 17827993.1.
European Search Report dated May 26, 2020, on European Patent Application No. 17827985.7.
Korean Notice of Allowance dated Jul. 1, 2020, on Korean Patent Application No. 10-2018-7036041.
U.S. Office Action dated Jul. 15, 2020, on U.S. Appl. No. 16/333,129.
Chinese Office Action dated Jul. 22, 2020, on Chinese Patent Applicatuin Ni, 201780056575.7.
Chinese Office Action dated Aug. 3, 2020, on Chinese Patent Application No. 201780056675.X.
European Search Report dated Aug. 13, 2020, on European Patent Application No. 17827983.2.
Korean Office Action dated Aug. 19, 2020, on Korean Patent Application No. 10-2020-7014910.
Chinese Office Action dated Aug. 12, 2020, on Chinese Patent Application No. 201780056687.2.

* cited by examiner

CLEANER

CROSS-REFERENCE TO RELATED APPLICATIONS

This application is a U.S. National Phase entry under 35 U.S.C. § 371 from PCT International Application No. PCT/KR2017/007560, filed Jul. 14, 2017, which claims the benefit of priority of U.S. Provisional Application No. 62/362,358, filed Jul. 14, 2016, the contents of which are incorporated herein by reference in its entirety.

TECHNICAL FIELD

The present invention relates to a cleaner that performs mopping.

BACKGROUND ART

A cleaner is a device that performs cleaning by suctioning dirt such as dust from the floor or mopping dirt on the floor. Recently, a cleaner capable of performing mopping has been developed. In addition, a robot cleaner is a device that performs cleaning autonomously via self-driving.

There has been known a robot cleaner capable of moving using a mop surface as the prior art (Korean Registered Patent No. 10-1602790). In the prior art, the robot cleaner includes a first rotating member and a second rotating member, to which a pair of mop surfaces is fixed so as to be arranged in the leftward-and-rightward direction, the first and second rotating members being tilted outwards and downwards relative to the vertical axis. The robot cleaner of the prior art is moved as the first rotating member and the second rotating member rotate in the state in which only the mop surfaces fixed to the first rotating member and the second rotating member are in contact with the floor.

DISCLOSURE

Korean Registered Patent No. 10-1602790 (Registered Date: Mar. 7, 2016)

Technical Problem

A first object of the present invention is to increase frictional force between a mop and a floor surface so that a cleaner performs a mopping operation and travels effectively.

The aforementioned robot cleaner of the prior art is supported by a pair of left and right mops in a two-point support manner, and thus has a problem in that stability in the forward-and-backward direction is deteriorated. A second object of the present invention is to solve this problem, thereby improving stability of the robot cleaner in the leftward-and-rightward direction and in the forward-and-backward direction.

The aforementioned robot cleaner of the prior art moves by rotation motion of a pair of left and right mops. However, the frictional force that is generated by rotation of the pair of mops frequently varies, and it is therefore difficult for the robot cleaner of the prior art to travel straight. If the robot cleaner cannot travel straight, an area that is not wiped by the robot cleaner increases in a floor surface on which the robot cleaner needs to travel straight, e.g. a floor surface near a wall. A third object of the present invention is to solve this problem.

If the robot cleaner is supported by a plurality of support points, the number of which is more than 2, in order to accomplish the aforementioned second object, the weight of the robot cleaner is dispersed to the plurality of support points. However, the frictional force, which is generated by operation at some of the support points, may be reduced according to the dispersion of the weight, and thus the traveling performance (the moving performance) of the robot cleaner may be degraded. A fourth object of the present invention is to solve this problem, thereby ensuring stability and improving traveling performance.

A fifth object of the present invention is to provide a device that is capable of performing a wet mopping operation and a dry cleaning operation (dry mopping and/or vacuum cleaning) in combination, thereby performing a thorough and efficient mopping operation.

Technical Solution

In accordance with an aspect of the present invention, the above and other objects can be accomplished by the provision of a cleaner including a first cleaning module including a left spin mop and a right spin mop configured to come into contact with the floor while rotating in a clockwise direction or in a counterclockwise direction when viewed from an upper side, a second cleaning module configured to come into contact with the floor in front of the first cleaning module, and a body supported by the first cleaning module and the second cleaning module. A point on the bottom surface of the left spin mop that receives the largest frictional force from the floor is located on a left-front side of the rotation center of the left spin mop, and a point on the bottom surface of the right spin mop that receives the largest frictional force from the floor is located on a right-front side of the rotation center of the right spin mop. A bottom surface of the left spin mop may have a downward incline in a left-forward direction, and a bottom surface of the right spin mop may have a downward incline in a right-forward direction.

The body may move by rotation motion of the first cleaning module without a separate driving wheel.

The second cleaning module may be configured to slide in contact with the floor along with movement of the body.

The cleaner may further include a water supply module configured to supply water to the first cleaning module. The first cleaning module may be configured to perform mopping while rotating. The second cleaning module may be configured to perform dry mopping.

The cleaner may further include a water tank configured to store water that is to be supplied to any one of the first cleaning module and the second cleaning module. The water tank may be disposed such that the center of gravity of the water tank is located behind the rotation center of the bottom surface of the left spin mop and the rotation center of the bottom surface of the right spin mop.

The cleaner may further include a battery for supplying power. The battery may be disposed such that the center of gravity of the battery is located behind the rotation center of the bottom surface of the left spin mop and the rotation center of the bottom surface of the right spin mop.

The bottom surface of the left spin mop may have the lowest point located at a left-front portion thereof, and the bottom surface of the right spin mop may have the lowest point located at a right-front portion thereof.

The water tank may be disposed such that the center of gravity of the water tank is located behind the lowest point on the bottom surface of the left spin mop and the lowest point on the bottom surface of the right spin mop.

The battery may be disposed such that the center of gravity of the battery is located behind the lowest point on the bottom surface of the left spin mop and the lowest point on the bottom surface of the right spin mop.

The body may be formed such that a volume of a portion thereof of an upper side of the first cleaning module is larger than a volume of a portion thereof of an upper side of the second cleaning module.

The first cleaning module may include a left rotating plate for fixing a mop unit of the left spin mop, and a left spin shaft fixed to the left rotating plate to rotate the left rotating plate. The first cleaning module may include a right rotating plate for fixing a mop unit of the right spin mop, and a right spin shaft fixed to the right rotating plate to rotate the right rotating plate.

The first cleaning module may include a left tilting rotary shaft extending in a direction perpendicular to an inclined direction of the bottom surface of the left spin mop, and a left tilting frame configured to support the left spin shaft and to be rotatable within a predetermined range about the left tilting rotary shaft. The first cleaning module may include a right tilting rotary shaft extending in a direction perpendicular to an inclined direction of the bottom surface of the right spin mop, and a right tilting frame configured to support the right spin shaft and to be rotatable within a predetermined range about the right tilting rotary shaft.

The left spin shaft may be disposed such that the upper end thereof is tilted to a left-front side relative to the lower end thereof, and the right spin shaft may be disposed such that the upper end thereof is tilted to a right-front side relative to the lower end thereof.

When viewed from a lower side, each of the inclined direction of the bottom surface of the left spin mop and the inclined direction of the bottom surface of the right spin mop may form an acute angle less than 45 degrees with respect to a leftward-and-rightward axis.

In accordance with another aspect of the present invention, there is provided a cleaner including a first cleaning module including a left spin mop and a right spin mop configured to come into contact with the floor while rotating in a clockwise direction or in a counterclockwise direction when viewed from an upper side, a second cleaning module configured to come into contact with the floor in front of the first cleaning module, a body supported by the first cleaning module and the second cleaning module, and a water supply module configured to supply water to the first cleaning module. The first cleaning module is configured to perform wet mopping while rotating, and the second cleaning module is configured to perform dry mopping.

The body may move by rotation motion of the first cleaning module without a separate driving wheel. The entire bottom surface of the left spin mop may be inclined downwards in the leftward direction, and the entire bottom surface of the right spin mop may be inclined downwards in the rightward direction.

Advantageous Effects

The cleaner is supported only by the first cleaning module and the second cleaning module, thereby enhancing mopping efficiency.

In addition, the stability of the cleaner in the leftward-and-rightward direction may be ensured by the left spin mop and the right spin mop, which are arranged in the leftward-and-rightward direction, and the stability of the cleaner in the forward-and-backward direction is also improved by the second cleaning module, which is disposed in front of the first cleaning module and is brought into contact with the floor.

Specifically, on the basis of the support point of the first cleaning module, the second cleaning module prevents the cleaner from overturning in the forward direction, and the mop surface of the first cleaning module prevents the cleaner from overturning in the backward direction.

In addition, since wobbling of the cleaner in the leftward-and-rightward direction is minimized by the frictional force provided by the second cleaning module, the cleaner is capable of traveling straight while being moved by the frictional force of the mop surface.

In addition, the load is dispersed such that a relatively large load is applied to the first cleaning module, which serves as a support point for travel of the cleaner, while ensuring the stability of the cleaner in the forward-and-backward direction and in the leftward-and-rightward direction.

Specifically, a left-front portion on the bottom surface of the left spin mop receives the largest frictional force, and a right-front portion on the bottom surface of the right spin mop receives the largest frictional force. Therefore, the ratio of the weight of the rear portion to the weight of the front portion on the basis of an imaginary axis that interconnects the two points that receive the largest frictional force increases. Accordingly, the ratio of the portion of the entire weight of the cleaner that is transmitted to the first cleaning module to the portion of the entire weight of the cleaner that is transmitted to the second cleaning module increases, thereby enhancing mopping efficiency and traveling efficiency via the rotation of the first cleaning module.

The body is formed such that the volume of the upper side of the first cleaning module is larger than the volume of the upper side of the second cleaning module. Accordingly, it is possible to dispose relatively large components at the upper side of the first cleaning module and to make the upper side of the first cleaning module heavier than the upper side of the second cleaning module. As a result, the load that is transmitted to the first cleaning module increases, leading to an improvement of traveling performance.

Since the center of gravity of the water tank and the center of gravity of the battery are located at relatively rear portions of the cleaner, it is possible to further increase the ratio of the size of the load that is transmitted to the first cleaning module to the size of the load that is transmitted to the second cleaning module.

Since each of the inclined direction of the bottom surface of the left spin mop and the inclined direction of the bottom surface of the right spin mop forms an acute angle less than 45 degrees with respect to the leftward-and-rightward axis, it is possible to relatively reduce the angular speed generated by the rotation of the left spin mop and the right spin mop for moving the cleaner in the forward-and-backward direction.

Specifically, when the linear speed (the speed in the tangential direction of a point of a rotating body) of the lowest point according to the angular speed of the left or right spin mop is decomposed into a component oriented in the forward-and-backward direction and a component oriented in the leftward-and-rightward direction, the component of the linear speed that is oriented in the forward-and-backward direction is greater than the component oriented in the leftward-and-rightward direction. When the left spin mop and the right spin mop are rotated, the frictional force applied to the cleaner in the leftward direction and the frictional force applied to the cleaner in the rightward direction by the component oriented in the leftward-and-rightward direction of the linear speed of each of the two lowest points offset each other, and the cleaner is moved by the frictional force that is applied to the cleaner by the component oriented in the forward-and-backward direction of the linear speed of each of the lowest points.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

BEST MODE

Figure 1:
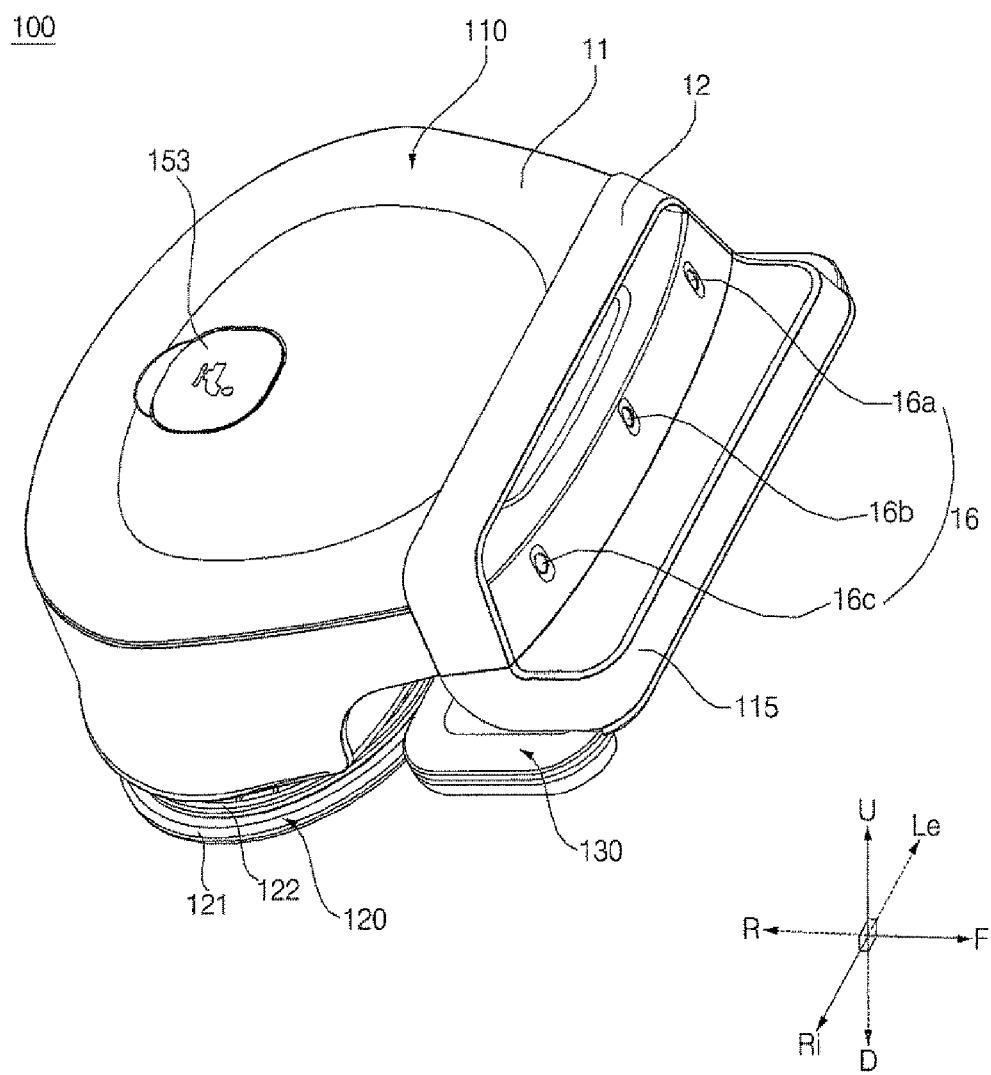
FIG. 1 is a perspective view of a cleaner 100 according to an embodiment of the present invention.
Figure 2:
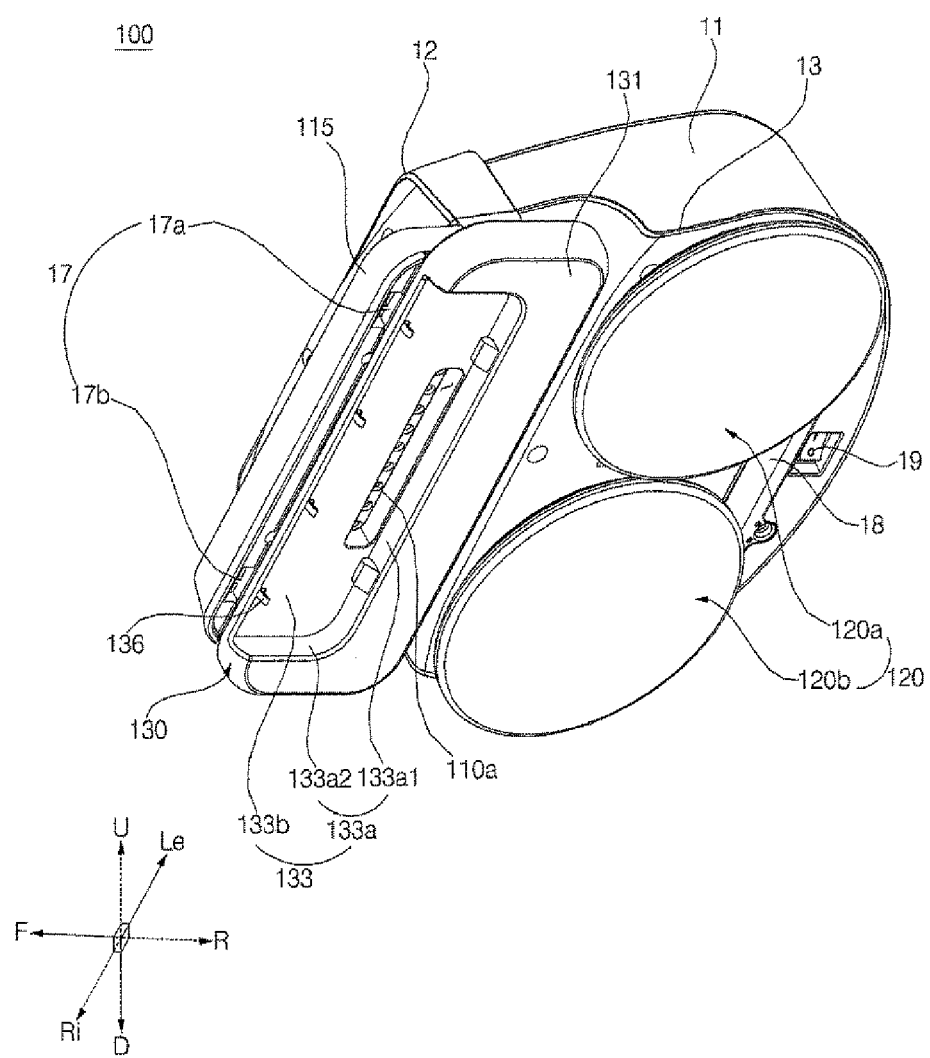
FIG. 2 is a perspective view of the cleaner 100 in FIG. 1 viewed at a different angle.
Figure 3:
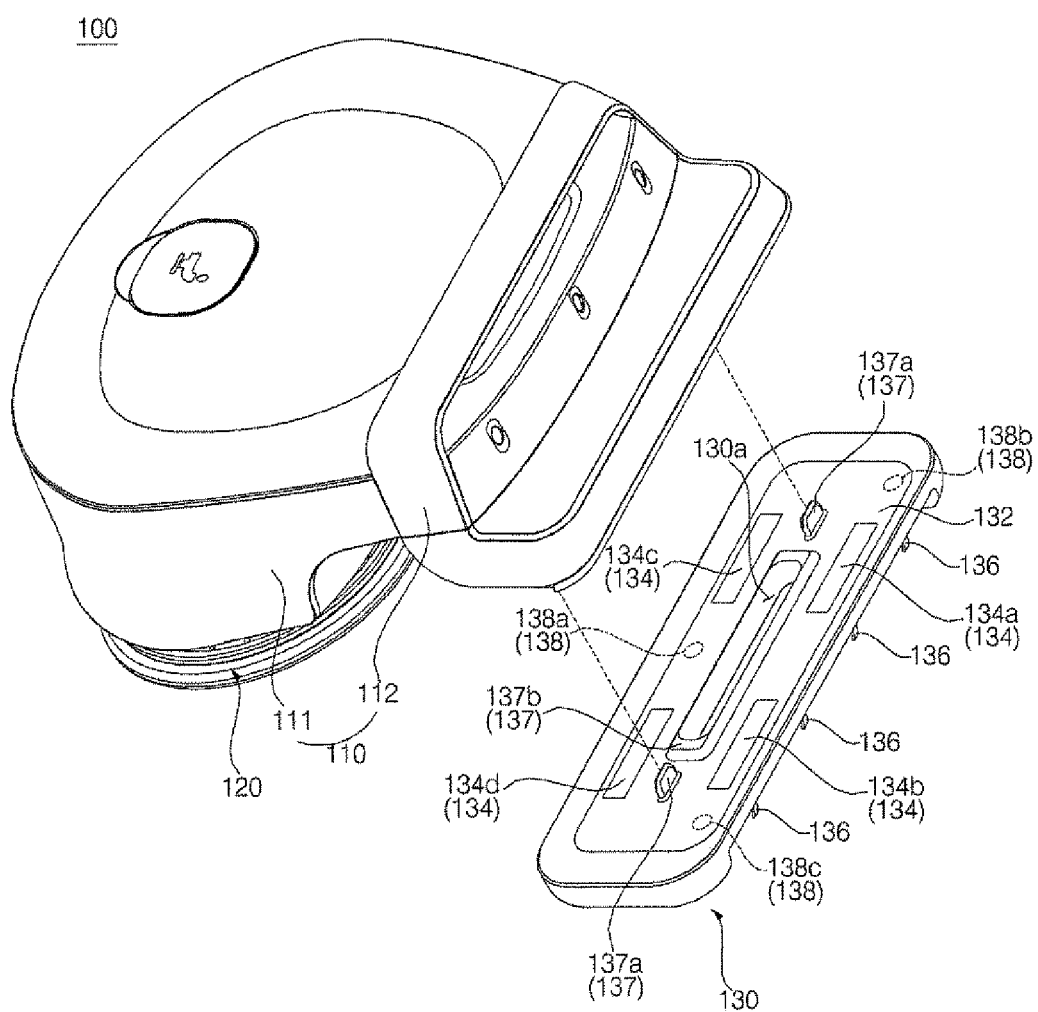
FIG. 3 is an exploded perspective view of a body 110 and a second cleaning module 130 in FIG. 1.
Figure 4:
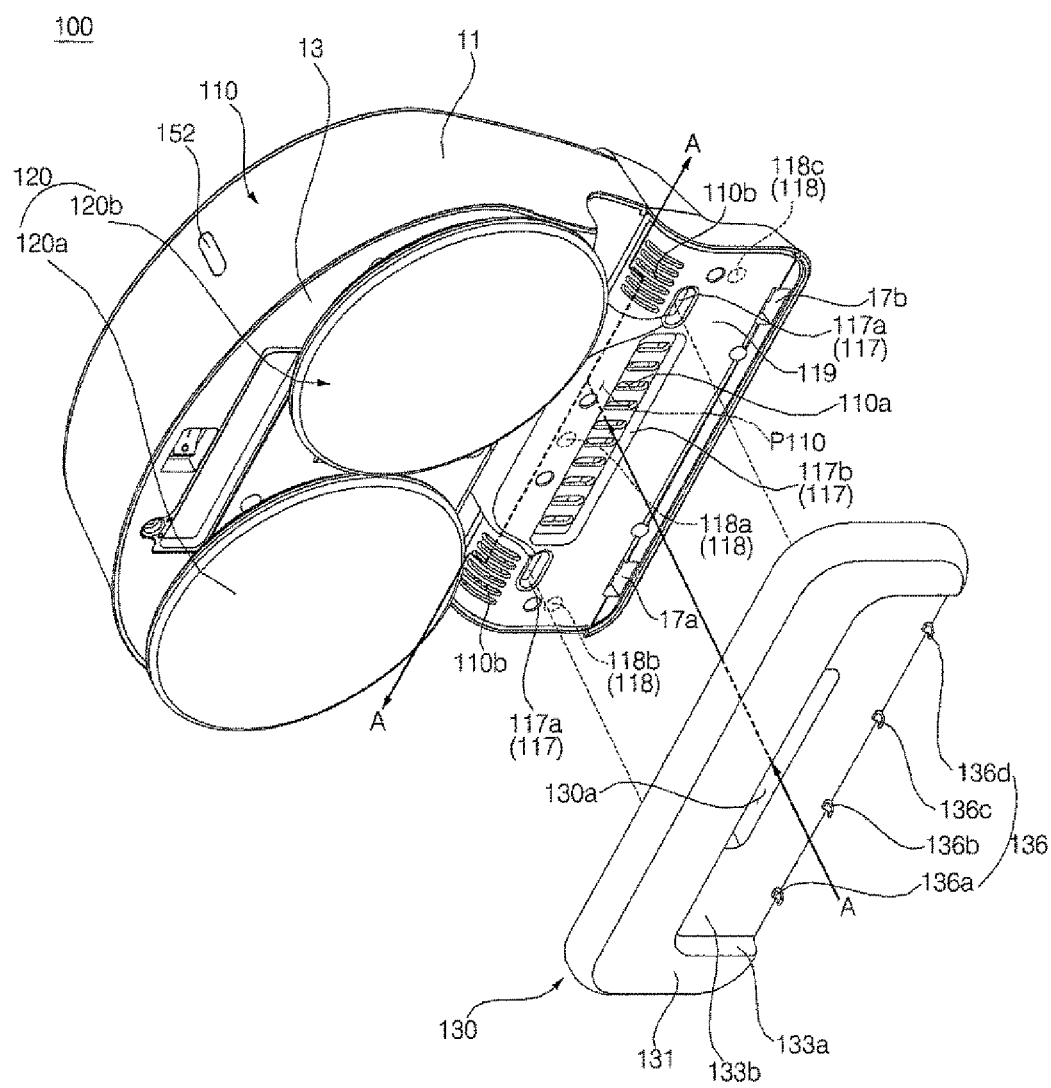
FIG. 4 is an exploded perspective view of the body 110 and the second cleaning module 130 in FIG. 3 viewed at a different angle.

Expressions referring to directions such as "front (F)/rear (R)/left (Le)/right (R)/upper (U)/lower (D)" mentioned below are defined based on the illustrations in the drawings, but this is merely given to describe the present invention for clear understanding thereof, and it goes without saying that the respective directions may be defined differently depending on where the reference is placed.

The use of terms, in front of which adjectives such as "first", "second", and "third" are used to describe constituent elements mentioned below, is intended only to avoid confusion of the constituent elements, and is unrelated to the order, importance, or relationship between the constituent elements. For example, an embodiment including only a second component but lacking a first component is also feasible.

The "mop" mentioned below may be applied variously in terms of material such as cloth or paper material, and may be used repeatedly by washing, or may be disposable.

The present invention may be applied to a cleaner that is manually moved by a user, a robot cleaner that autonomously travels, or the like. Hereinafter, the present embodiment will be described with reference to a robot cleaner.

Referring to FIGS. 1 to 10, a cleaner 100 according to an embodiment of the present invention includes a body 110 and a controller 20 mounted in the body 110. The cleaner 100 includes a first cleaning module 120 for supporting the body 110. The cleaner 100 includes a second cleaning module 130 for supporting the body 110. The body 110 is supported by the first cleaning module 120 and the second cleaning module 130.

The first cleaning module 120 is configured to perform mopping via contact with a floor. The first cleaning module 120 is configured to perform mopping while rotating clockwise or counterclockwise when viewed from the upper side. The first cleaning module 120 includes a left spin mop 120a and a right spin mop 120b. The first cleaning module 120 is disposed at the lower side of the body 110. The first cleaning module 120 is disposed behind the second cleaning module 130. The cleaner 100 may be configured such that the body 110 can move by rotation motion of the first cleaning module 120 without a separate driving wheel. That is, the body may move by rotation motion of the left spin mop 120a and the right spin mop 120b without a separate driving wheel. Here, the term "driving wheel" refers to a wheel having a traveling function to move the body, and thus an auxiliary wheel, which does not have a traveling function but supports the body with respect to the floor, is not considered a driving wheel.

The second cleaning module 130 may be configured to perform mopping via contact with the floor. The second cleaning module 130 is disposed at the lower side of the body 110. The second cleaning module 130 is disposed in front of the first cleaning module 120.

In the present embodiment, the second cleaning module 130 is configured to perform mopping via sliding on the floor along with the movement of the body 110.

In another example, the second cleaning module 130 may be configured to perform a vacuum-cleaning operation.

In a further example, the second cleaning module 130 may include a rolling member (not shown), which is configured to rotate. The rotation axis of the rolling member may extend in the horizontal direction (for example, in the leftward-and-rightward direction). The second cleaning module 130 may be configured to perform mopping or sweeping by rotation motion of the rolling member. The rolling member may include a mop unit so as to perform mopping. The rolling member may include a brush so as to perform sweeping.

Although the present invention will be described below with reference to the present embodiment, the concrete configuration for the cleaning operation of the second cleaning module 130 may be variously modified, as long as the second cleaning module 130 is configured to contact the floor and to support the body.

The cleaner 100 includes a water supply module 150 for supplying water required for mopping. The water supply module 150 may supply water required for the mopping operation of the first cleaning module 120 or the second cleaning module 130. The water supply module 150 includes a water tank 151 for storing water that is to be supplied to the first cleaning module 120 or the second cleaning module 130. In the present embodiment, the first cleaning module 120 is configured to perform wet mopping (mopping with water), and the water supply module 150 supplies water to the first cleaning module 120. In addition, in the present embodiment, the second cleaning module 130 is configured to perform dry mopping (mopping without supplying water), and the water supply module 150 does not supply water to the second cleaning module 130. Hereinafter, a description will be made based on the present embodiment, but the invention is not necessarily limited thereto. The water supply module 150 may be configured to supply water to the second cleaning module 130, rather than to the first cleaning module 120, or may be configured to supply water to both the first cleaning module 120 and the second cleaning module 130.

The cleaner 100 includes a battery 160 for supplying power required for rotation of the first cleaning module 120. In the present embodiment, power is not supplied to the second cleaning module 130, but the invention is not necessarily limited thereto.

Referring to FIGS. 1 to 7, the cleaner 100 includes a case 11 forming the external appearance thereof. The case 11 forms the top surface, the front surface, the rear surface, the left surface and the right surface of the body 110. The cleaner 100 includes a base 13 forming the bottom surface of the body 110. The first cleaning module 120 is fixed to the base 13. The second cleaning module 130 is fixed to the base 13. The controller 20, the water supply module 150 and the battery 160 are disposed in the internal space, which is defined by the case 11 and the base 13. The cleaner 100 may include a knob 12 to allow a user to lift the cleaner 100.

The cleaner 100 includes a water tank opening/closing unit 153 for opening or closing the water tank 151. The water tank opening/closing unit 153 is disposed at the top surface of the body 110. The cleaner 100 includes a water level indicator 152 for indicating the water level in the water tank 151. The water level indicator 152 may be formed of a transparent material so that a user can observe the water level in the water tank 151 disposed in the body 110. The water level indicator 152 is disposed at the rear portion of the body 110.

The cleaner 100 includes an obstacle sensor 16 that senses an obstacle ahead of the cleaner 100. The obstacle sensor 16 may include a plurality of obstacle sensors 16a, 16b and 16c. The obstacle sensor 16 is disposed at the front surface of the body 110.

The cleaner 100 includes a cliff sensor 17, which senses the presence or absence of a cliff on the floor within the region to be cleaned. The cliff sensor 17 may include a plurality of cliff sensors 17a and 17b. The cliff sensor 17 may sense the presence or absence of a cliff ahead of the second cleaning module 130. The cliff sensor 17 is disposed at the lower-front portion of a bumper 115.

The cleaner 100 includes a battery-receiving portion 18 to put the battery 160 into or draw the battery 160 out of the body 110. The cleaner 100 includes a power switch 19 for turning on or off the supply of power. The cleaner 100 may include an input unit (not shown), to which a user inputs various commands. The cleaner 100 may include a communication module (not shown) for communicating with an external device.

The cleaner 100 includes the controller 20 for controlling the autonomous travel thereof. The controller 20 may process the sensing signal of the obstacle sensor 16 or the sensing signal of the cliff sensor 17. The controller 20 may process the signal of the input unit or the signal transmitted via the communication module. The controller 20 includes a printed circuit board (PCB) 20 disposed inside the body 110 (refer to FIG. 8).

The body 110 includes a first unit 111, which is disposed at the upper side of the first cleaning module 120, and a second unit 112, which is disposed at the upper side of the second cleaning module 130. The body 110 is formed such that the volume of the upper side of the first cleaning module 120 is larger than the volume of the upper side of the second cleaning module 130. Specifically, the first unit 111 has a larger volume than the second unit 112. The first unit 111 has a larger width in the forward-and-backward direction, a larger width in the leftward-and-rightward direction and a larger width in the vertical direction than the second unit 112. Accordingly, it is possible to dispose relatively large components inside the first unit 111 and to make the first unit 111 heavier than the second unit 112. If the first unit 111 is made heavier than the second unit 112, the load that is transmitted to the first cleaning module 120 increases, leading to an improvement of traveling performance.

The body 110 includes the bumper 115, which senses external shocks. The bumper 115 is disposed at the front portion of the body 110. The bumper 115 is disposed in front of the second cleaning module 130. The bumper 115 is disposed at the upper side of the second cleaning module 130.

The second cleaning module 130 is separably provided at the body 110. In this case, the body 110 includes a module-seating portion 119, in which the second cleaning module 130 is seated. The module-seating portion 119 is disposed at the lower side of the front portion of the body 110. The second cleaning module 130 includes a body-seating portion 132, in which the body 110 is seated. The body-seating portion 132 is disposed at the upper side of the second cleaning module 130. The module-seating portion 119 and the body-seating portion 132 are disposed at positions that correspond to each other (refer to FIGS. 3 and 4).

In order to couple the body 110 and the second cleaning module 130 to each other, the second cleaning module 130 includes a first coupling member 138, and the body 110 includes a second coupling member 118, which corresponds to the first coupling member 138. The first coupling member 138 and the second coupling member 118 are formed so as to be coupled to each other. The first coupling member 138 is disposed at the body-seating portion 132. The second coupling member 118 is disposed at the module-seating portion 119. The first coupling member 138 may include a plurality of first coupling members 138a, 138b and 138c, and the second coupling member 118 may include a plurality of second coupling members 118a, 118b and 118c that respectively correspond to the first coupling members 138a, 138b and 138c. One of the first coupling member 138 and the second coupling member 118 may include a magnet, and the other one may include a material (a magnet or metal) that is attracted to the above magnet.

The cleaner 100 includes a guide protrusion 137 and a guide 117, which guide the coupling between the body 110 and the second cleaning module 130. One of the guide protrusion 137 and the guide 117 is disposed at the body-seating portion 132, and the other one is disposed at the module-seating portion 119. The guide protrusion 137 may include a plurality of guide protrusions 137a and 137b. The guide 117 may include a plurality of guides 117a and 117b. The guide 117 may have therein a recess or a hole, into which the guide protrusion 137 is inserted. A first guide protrusion 137a protrudes upwards from the second cleaning module 130. A second guide protrusion 137b protrudes upwards from the second cleaning module 130, and has a module hole 130a that vertically penetrates the center portion thereof. A first guide 117a is disposed at the body 110, and has therein a recess, into which the first guide protrusion 137a is inserted. A second guide 117b is disposed at the body 110, and has therein a recess, into which the second guide protrusion 137b is inserted. A first flow passage distal end 110a is disposed at the second guide 117b to interconnect the module hole 130a and an air flow passage P110. A fan may be disposed in the air flow passage P110. The fan may apply pressure to air so as to suck air through the module hole 130a.

The body 110 includes the air flow passage P110, which extends through the inside of the body 110. The air flow passage P110 interconnects the first flow passage distal end 110a and a second flow passage distal end 110b. The first flow passage distal end 110a and the second flow passage distal end 110b form openings in the outer surface of the body 110. Air may be introduced into the body 110 through one of the first flow passage distal end 110a and the second flow passage distal end 110b, and may be discharged out of the body 110 through the other one thereof. The arrows A in FIG. 4 indicate the direction in which air flows in one embodiment. Air may sequentially pass through the module hole 130a and the first flow passage distal end 110a from the lower side of the second cleaning module 130, and may be introduced into the air flow passage P110. The air introduced into the air flow passage P110 may be discharged outside through the second flow passage distal end 110b. The bottom surface of the body 110, which is formed between the first cleaning module 120 and the second cleaning module 130, is recessed upwards so as to form a body gap 110c. The second flow passage distal end 110b is disposed at a position that faces the body gap 110c.

The second cleaning module 130 is configured to contact the floor in front of the first cleaning module 120. The second cleaning module 130 is configured to slide in contact with the floor along with the movement of the body 110. The second cleaning module 130 is configured to perform mopping by sliding on the floor. The second cleaning module 130 is configured to perform dry mopping.

The second cleaning module 130 includes a lower surface portion 131, which is disposed at the lower side thereof. The lower surface portion 131 may be formed such that the front-middle portion thereof is recessed in the backward direction.

Figure 5:
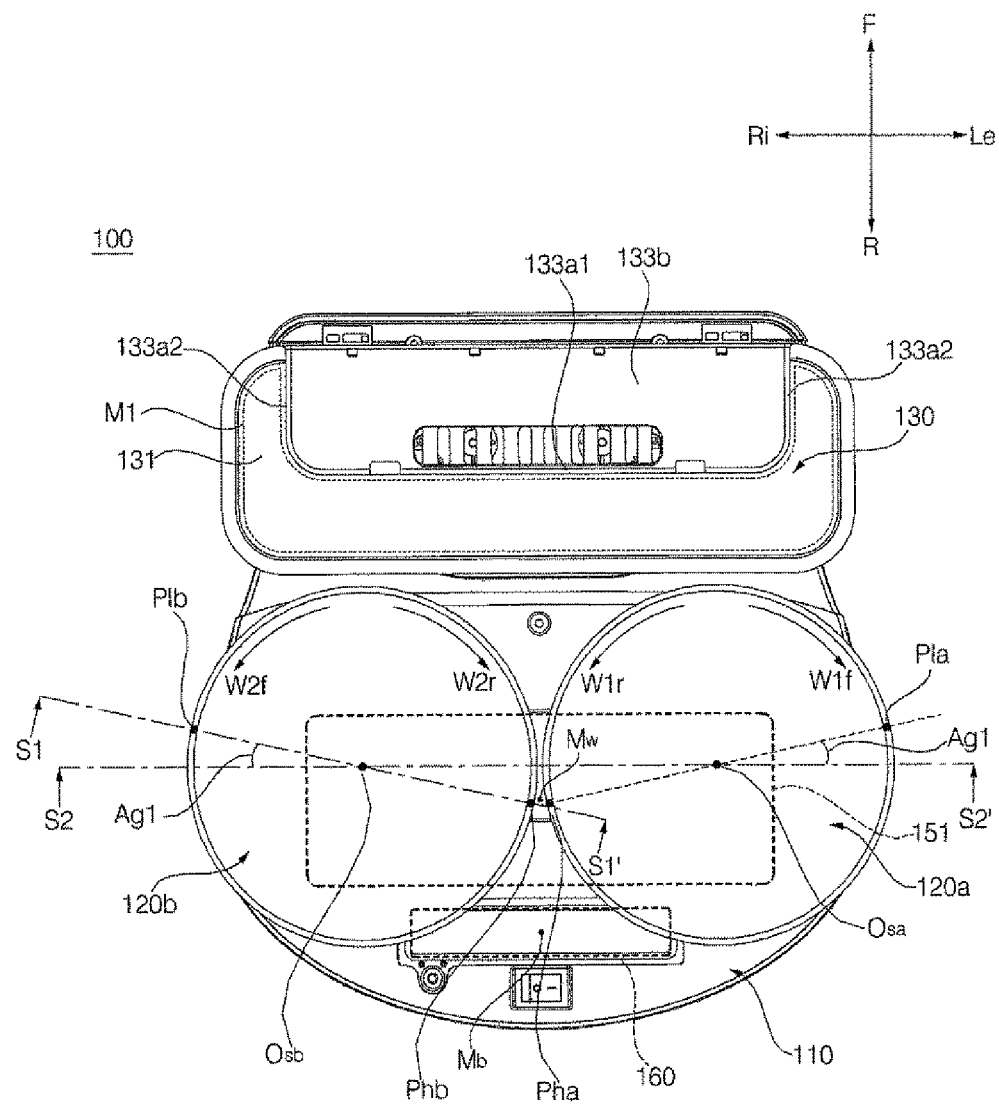
FIG. 5 is a bottom view of the cleaner 100 in FIG. 1.
Figure 6:
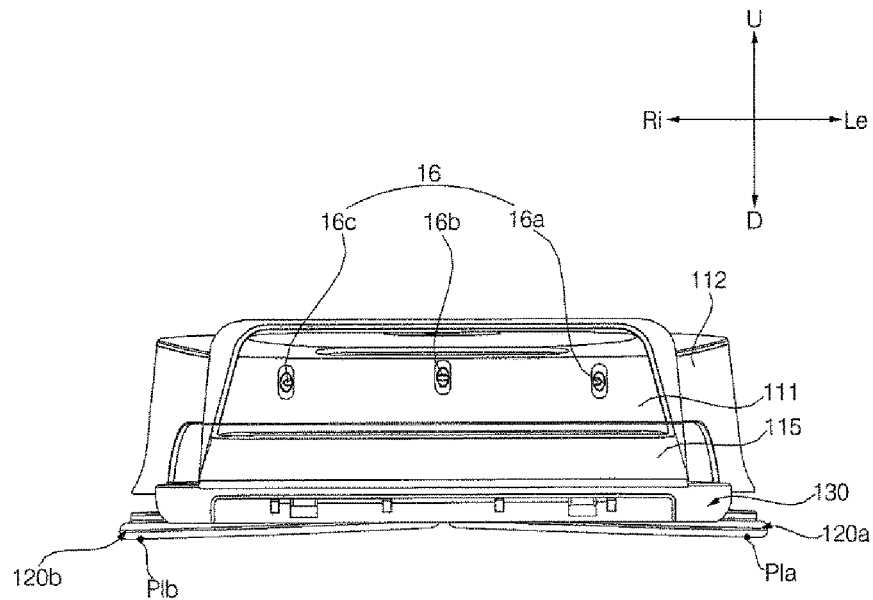
FIG. 6 is a front elevational view of the cleaner 100 in FIG. 1.
Figure 7:
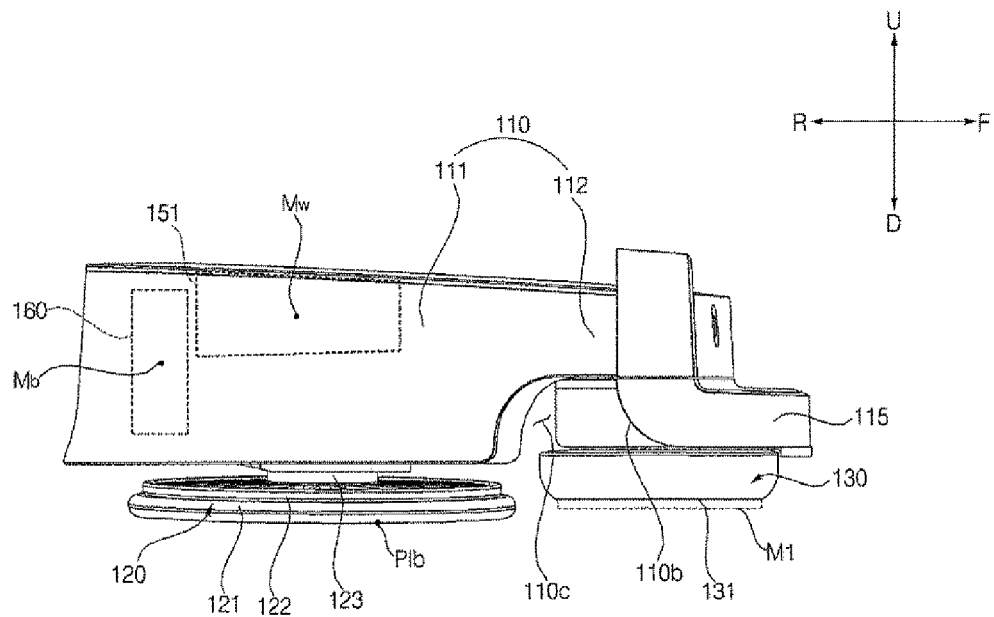
FIG. 7 is a (right) side elevational view of the cleaner 100 in FIG. 1.

The second cleaning module 130 may include a mop unit Ml, which is fixed to the lower surface portion 131 (refer to FIGS. 5 and 7). In this case, the weight of the body 110 may be transmitted to the floor via the lower surface portion 131 and the mop unit Ml. When the body 110 moves, the mop unit Ml may perform mopping by moving on the floor.

Regardless of the presence or absence of the mop unit Ml according to the embodiment, a mop-fixing member 134 for fixing a replaceable mop to the second cleaning module 130 is provided. The mop-fixing member 134 may include a piece of Velcro tape. The mop-fixing member 134 may include a plurality of mop-fixing members 134a, 134b, 134c and 134d. The mop-fixing members 134a, 134b, 134c and 134d are disposed at the body-seating portion 132. A user may envelop the second cleaning module 130 with the replaceable mop, and may fix the replaceable mop to the mop-fixing member 134 in the state in which a portion of the replaceable mop is disposed between the floor and the lower surface portion 131. In another embodiment, the mop-fixing member may include a hook for fixing the replaceable mop.

The second cleaning module 130 includes a collection portion 133, which is disposed at the front side of the lower surface portion 131. The collection portion 133 defines a collection space for collecting therein foreign substances. The collection space has an opened front side and an opened lower side. The second cleaning module 130 includes a blocking portion 133a, which forms surfaces for defining the collection space. The blocking portion 133a includes a rear blocking portion 133a1, which forms the rear surface of the collection space, and a lateral blocking portion 133a2, which forms the left and right surfaces of the collection space. The second cleaning module 130 includes a collection-portion upper surface 133b, which forms the upper surface of the collection space. The collection-portion upper surface 133b is disposed at a position higher than the lower surface portion 131. The module hole 130a is formed in the collection-portion upper surface 133b.

The second cleaning module 130 includes a collection supplementary member 136, which is disposed at the front side of the collection portion 133. The collection supplementary member 136 protrudes downwards from the collection-portion upper surface 133b. The collection supplementary member 136 serves to prevent the foreign substances introduced into the collection portion 133 from easily escaping from the collection portion 133. A plurality of collection supplementary members 136a, 136b, 136c and 136d may be formed so as to be spaced apart from each other in the leftward-and-rightward direction. The collection supplementary member 136 may be formed of a flexible material. The collection supplementary member 136 is formed in a shape that is bent backwards. Therefore, when force is applied to the collection supplementary member 136 in the backward direction, the collection supplementary member 136 is bent relatively easily. However, when force is applied to the collection supplementary member 136 in the forward direction, the collection supplementary member 136 is not easily bent.

When the second cleaning module 130 is enveloped by the replaceable mop, the collection portion 133 and the collection supplementary member 136 are also enveloped by the replaceable mop. The portion of the replaceable mop that envelops the collection portion 133 may be easily recessed into the collection space. Accordingly, a foreign substance having a relatively large volume may be easily introduced into the recessed portion of the replaceable mop that envelops the collection portion 133. The recessed portion of the replaceable mop that envelops the collection portion 133 is prevented from moving in the forward direction by the collection supplementary member 136. Accordingly, the foreign substance introduced into the recessed portion of the replaceable mop that envelops the collection portion 133 is prevented from easily escaping.

The first cleaning module 120 includes the left spin mop 120a and the right spin mop 120b, which are configured to contact the floor while rotating clockwise or counterclockwise when viewed from the upper side. The first cleaning module 120 is configured to perform mopping by rotation motion of the left spin mop 120a and the right spin mop 120b. In the description, among the components of the first cleaning module 120, a component in which "left" is affixed to the front of the name thereof is a component for operating the left spin mop 120a, and a component in which "right" is affixed to the front of the name thereof is a component for operating the right spin mop 120b. In a description related to the components of the first cleaning module 120, when it is unnecessary to distinguish "left" and "right" from each other, the corresponding description may be applied to both "left" and "right".

Referring to FIG. 5, the point at which the rotation axis of the left spin mop 120a and the bottom surface of the left spin mop 120a meet is defined as a rotation center Osa of the left spin mop 120a. The point at which the rotation axis of the right spin mop 120b and the bottom surface of the right spin mop 120b meet is defined as a rotation center Osb of the right spin mop 120b. When viewed from the lower side, the clockwise rotation direction of the left spin mop 120a is defined as a first forward direction w1f, and the counterclockwise rotation direction of the left spin mop 120a is defined as a first reverse direction w1r. When viewed from the lower side, the counterclockwise rotation direction of the right spin mop 120b is defined as a second forward direction w2f, and the clockwise rotation direction of the right spin mop 120b is defined as a second reverse direction w2r. In addition, when viewed from the lower side, an "acute angle that the inclined direction of the bottom surface of the left spin mop 120a makes with the leftward-and-rightward axis" and an "acute angle that the inclined direction of the bottom surface of the right spin mop 120b makes with the leftward-and-rightward axis" are defined as inclined-direction angles Ag1. The inclined-direction angle Ag1 of the left spin mop 120a and the inclined-direction angle Ag1 of the right spin mop 120b may be the same as each other. In addition, referring to FIG. 11, an "angle that the bottom surface I of the left spin mop 120a makes with an imaginary horizontal plane H" and an "angle that the bottom surface I of the right spin mop 120b makes with the imaginary horizontal plane H" are defined as inclination angles Ag2.

When the left spin mop 120a rotates, the point Pla on the bottom surface of the left spin mop 120a that receives the largest frictional force from the floor is located on the left-front side of the rotation center Osa of the left spin mop 120a. When the right spin mop 120b rotates, the point Plb on the bottom surface of the right spin mop 120b that receives the largest frictional force from the floor is located on the right-front side of the rotation center Osb of the right spin mop 120b. The largest frictional force may be generated at the point Pla by transmitting a larger load from the point Pla to the floor than from any other point on the bottom surface of the left spin mop 120a. The largest frictional force may be generated at the point Plb by transmitting a larger load from the point Plb to the floor than from any other point on the bottom surface of the right spin mop 120b.

In order to make the point Pla receive larger frictional force from the floor than any other point on the bottom surface of the left spin mop 120a, configuration may be variously made according to the embodiments set forth below.

In a first embodiment, the left spin mop 120a may be arranged such that the bottom surface thereof is inclined downwards in the direction from the rotation center Osa to the point Pla. In this case, the point Pla becomes the lowest point Pla on the bottom surface of the left spin mop 120a.

In a second embodiment (not shown), the left spin mop 120a may be arranged such that the bottom surface thereof lies horizontally, and a plurality of springs (not shown) may be arranged on the top surface of a lower rotating plate (not shown), which fixes the bottom surface of the left spin mop 120a, in the rotation direction about the rotation axis. In this case, an upper rotating plate (not shown), which supports the upper ends of the springs, may be arranged at a downward incline in the direction from the rotation center Osa to the point Pla. When the upper rotating plate rotates, the respective springs also rotate, and undergo elastic compression and elastic restoration repeatedly. At this time, among the springs, the spring that is disposed near the point Pla on the basis of the rotation center Osa is compressed to the largest extent. Accordingly, the point Pla receives larger frictional force from the floor than any other point on the bottom surface of the left spin mop 120a.

In order to make the point Plb receive larger frictional force from the floor than any other point on the bottom surface of the right spin mop 120b, the first embodiment and the second embodiment may be applied in the same manner by those skilled in the art. Hereinafter, a description will be made with reference to the first embodiment.

The bottom surface of the left spin mop 120a and the bottom surface of the right spin mop 120b are respectively arranged at an incline. The inclination angle Ag2 of the left spin mop 120a and the inclination angle Ag2 of the right spin mop 120b are acute angles. In the present embodiment, the inclination angle Ag2 ranges from about 3 to 6 degrees. The inclination angle Ag2 may be set to be small such that the points Pla and Plb receive the largest frictional force and such that the entire bottom area of the mop unit 121 contacts the floor by rotation motion of the left spin mop 120a and the right spin mop 120b.

The bottom surface of the left spin mop 120a extends at a downward incline in the left-forward direction. The bottom surface of the right spin mop 120b extends at a downward incline in the right-forward direction. The bottom surface of the left spin mop 120a has the lowest point Pla located at the left-front portion thereof. The bottom surface of the left spin mop 120a has the highest point Pha located at the right-rear portion thereof (in the direction toward the region between the right side and the rear side). The bottom surface of the right spin mop 120b has the lowest point Plb located at the right-front portion thereof. The bottom surface of the right spin mop 120b has the highest point Phb located at the left-rear portion thereof (in the direction toward the region between the left side and the rear side). When a "ratio of the weight of the rear portion to the weight of the front portion on the basis of an imaginary axis that interconnects the two lowest points Pla and Plb" is defined as a "rear-weight ratio", the rear-weight ratio increases as the two lowest points Pla and Plb are closer to the front end portion. If the rear-weight ratio increases, a ratio of the portion of the entire weight of the cleaner 100 that is transmitted to the first cleaning module 120 disposed at the rear portion to the portion of the entire weight of the cleaner 100 that is transmitted to the second cleaning module 130 disposed at the front portion increases. If the ratio of the weight transmitted to the first cleaning module 120 to the weight transmitted to the second cleaning module 130 increases, mopping efficiency and traveling efficiency via the rotation of the first cleaning module 120 are enhanced.

Referring to FIG. 5, in order to make the cleaner 100 move straight in the forward direction, the left spin mop 120a may be rotated at a predetermined number of revolutions per minute (rpm) R1 in the first forward direction w1f, and the right spin mop 120b may be rotated at the predetermined rpm R1 in the second forward direction w2f. In order to make the cleaner 100 move straight in the backward direction, the left spin mop 120a may be rotated at a predetermined rpm R2 in the first reverse direction w1r, and the right spin mop 120b may be rotated at the predetermined rpm R2 in the second reverse direction w2r. In order to turn the cleaner 100 to the right, the left spin mop 120a may be rotated at a predetermined rpm R3 in the first forward direction w1f, and the right spin mop 120b may be operated as follows: (i) it may be rotated in the second reverse direction w2r; (ii) it may be stopped without rotation; or (iii) it may be rotated in the second forward direction w2f at a predetermined rpm R4, which is lower than the rpm R3. In order to turn the cleaner 100 to the left, the right spin mop 120b may be rotated at a predetermined rpm R5 in the second forward direction w2f, and the left spin mop 120a may be operated as follows: (i) it may be rotated in the first reverse direction w1r; (ii) it may be stopped without rotation; or (iii) it may be rotated in the first forward direction w1f at a predetermined rpm R6, which is lower than the rpm R5.

The entire bottom surface of the left spin mop 120a is inclined downwards in the leftward direction, and the entire bottom surface of the right spin mop 120b is inclined downwards in the rightward direction. Depending on the embodiment, the inclined-direction angle Ag1 may be 0 degrees. In addition, depending on the embodiment, when viewed from the lower side, the inclined direction of the bottom surface of the left spin mop 120a may form an inclined-direction angle Ag1 in the clockwise direction with respect to the leftward-and-rightward axis, and the inclined direction of the bottom surface of the right spin mop 120b may form an inclined-direction angle Ag1 in the counterclockwise direction with respect to the leftward-and-rightward axis. In the present embodiment, in order to exhibit the weight dispersion effect, when viewed from the lower side, the inclined direction of the bottom surface of the left spin mop 120a forms an inclined-direction angle Ag1 in the counterclockwise direction with respect to the leftward-and-rightward axis, and the inclined direction of the bottom surface of the right spin mop 120b forms an inclined-direction angle Ag1 in the clockwise direction with respect to the leftward-and-rightward axis.

The inclined-direction angle Ag1 of the left spin mop 120a and the inclined-direction angle Ag1 of the right spin mop 120b respectively form an acute angle. When viewed from the lower side, the inclined direction of the bottom surface of the left spin mop 120a forms an acute angle in the counterclockwise direction with respect to the leftward-and-rightward axis, and the inclined direction of the bottom surface of the right spin mop 120b forms an acute angle in the clockwise direction with respect to the leftward-and-rightward axis.

When viewed from the lower side, each of the inclined direction of the bottom surface of the left spin mop 120a and the inclined direction of the bottom surface of the right spin mop 120b forms an acute angle less than 45 degrees with respect to the leftward-and-rightward axis. Accordingly, when the linear speed (the speed in the tangential direction of a point of a rotating body) of the lowest point Pla or Plb according to the angular speed of the left or right spin mop 120a or 120b is decomposed into a component oriented in the forward-and-backward direction and a component oriented in the leftward-and-rightward direction, the component of the linear speed that is oriented in the forward-and-backward direction may be greater than the component oriented in the leftward-and-rightward direction. For example, when the left spin mop 120a is rotated at a specific angular speed in the first forward direction w1f and the right spin mop 120b is rotated at a specific angular speed in the second forward direction w2f, the frictional force applied to the cleaner 100 in the leftward direction and the frictional force applied to the cleaner 100 in the rightward direction by the component oriented in the leftward-and-rightward direction of the linear speed of each of the two lowest points Pla and Plb offset each other, and the cleaner 100 is moved forwards by the frictional force that is applied to the cleaner 100 by the component oriented in the forward-and-backward direction of the linear speed of each of the lowest points Pla and Plb. Therefore, as a result of setting the inclined-direction angle Ag1 to be an acute angle less than 45 degrees, it is possible to relatively reduce the angular speed generated by the rotation of the left spin mop 120a and the right spin mop 120b for moving the cleaner 100 in the forward-and-backward direction.

Figure 15:
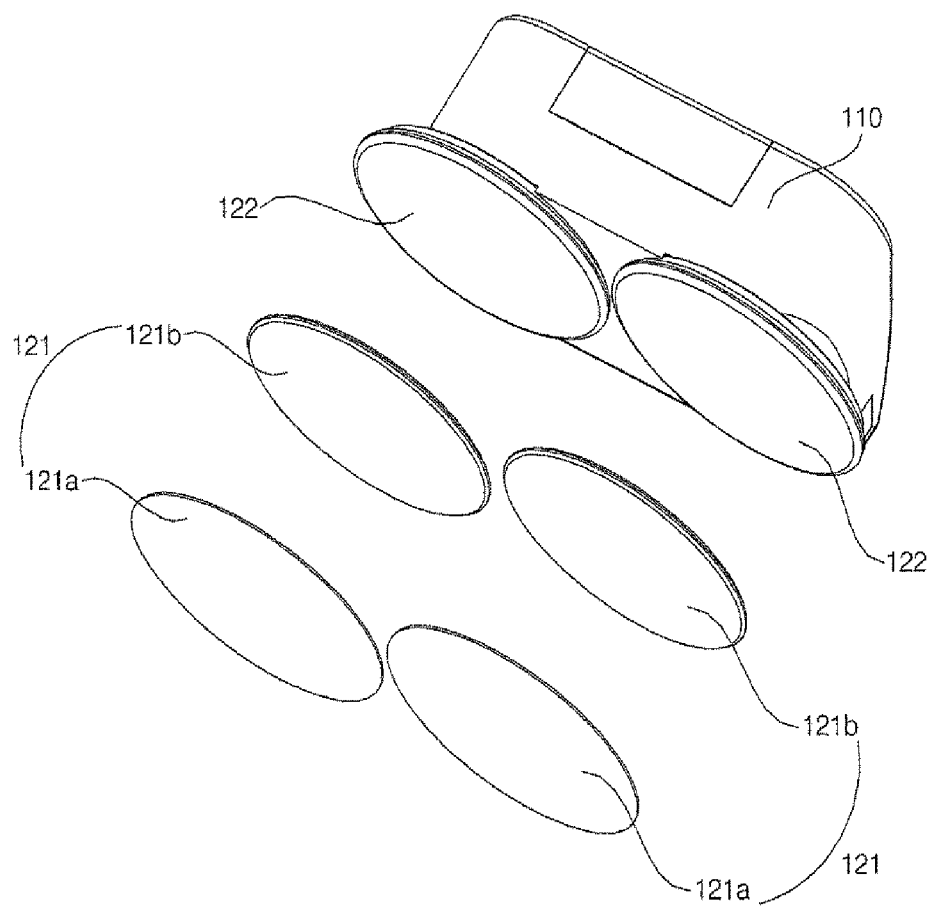
FIG. 15 is an exploded perspective view of an exemplary mop unit 121, which is attached to the first cleaning module 120 in FIG. 1.

The first cleaning module 120 includes the mop unit 121, which is disposed on each of the bottom surface of the left spin mop 120a and the bottom surface of the right spin mop 120b. The mop unit 121 may be fixedly disposed on the left spin mop 120a and the right spin mop 120b, or may be disposed in a manner such that it is replaceable. The mop unit 121 may be separably fixed to the left spin mop 120a and the right spin mop 120b via a piece of Velcro tape, a hook, or the like. Referring to FIG. 15, the mop unit 121 may include a mop 121a and a spacer 121b. The mop 121a serves to perform mopping in contact with the floor. The spacer 121b may be disposed between the rotating plate 122 and the mop 121a, and may serve to adjust the position of the mop 121a. The spacer 121b may be separably fixed to the rotating plate 122, and the mop 121a may be separably fixed to the spacer 121b. Needless to say, the mop unit 121 may include only the mop 121a, and may not include the spacer 121b.

Figure 12:
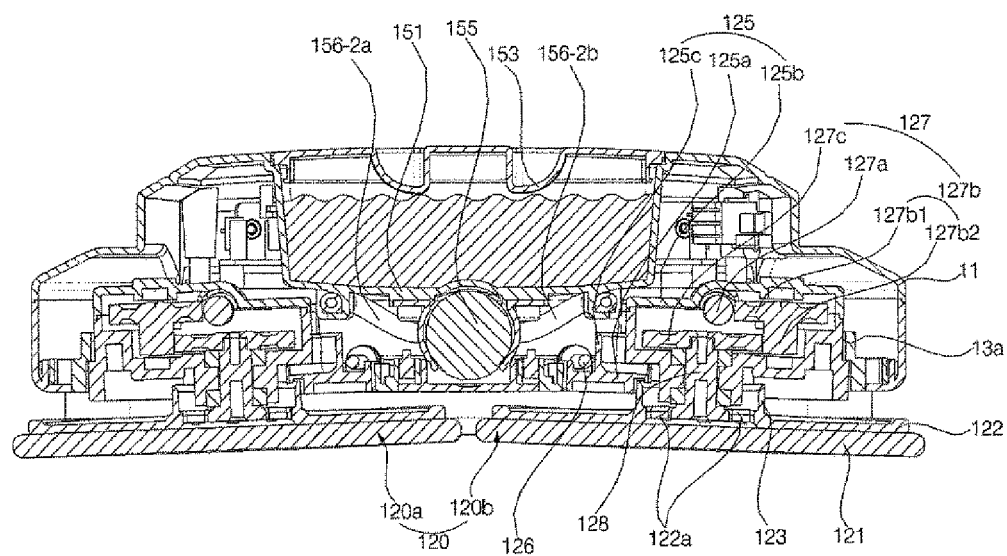
FIG. 12 is a vertical cross-sectional view of the cleaner 100 taken along line S2-S2' in FIGS. 5 and 10.
Figure 13:
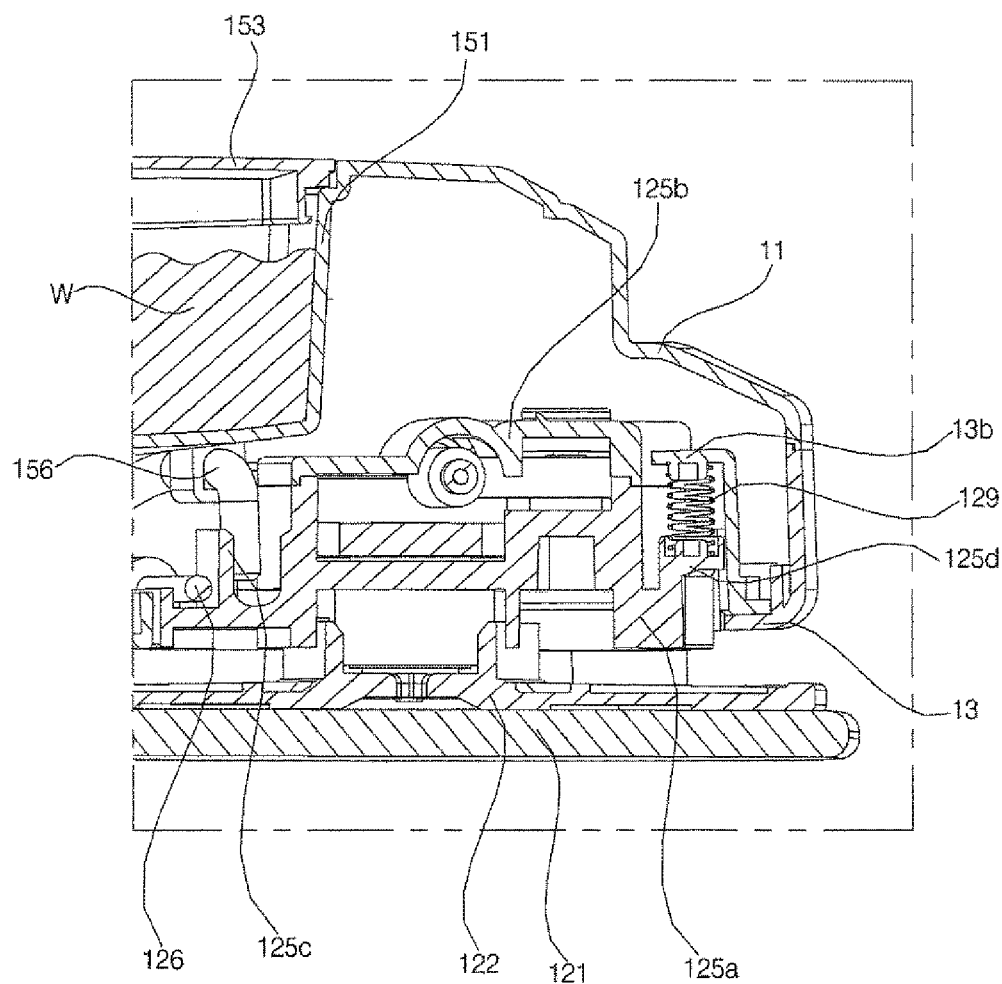
FIG. 13 is a vertical cross-sectional view of the cleaner 100 taken along line S3-S3' in FIG. 10.
Figure 14:
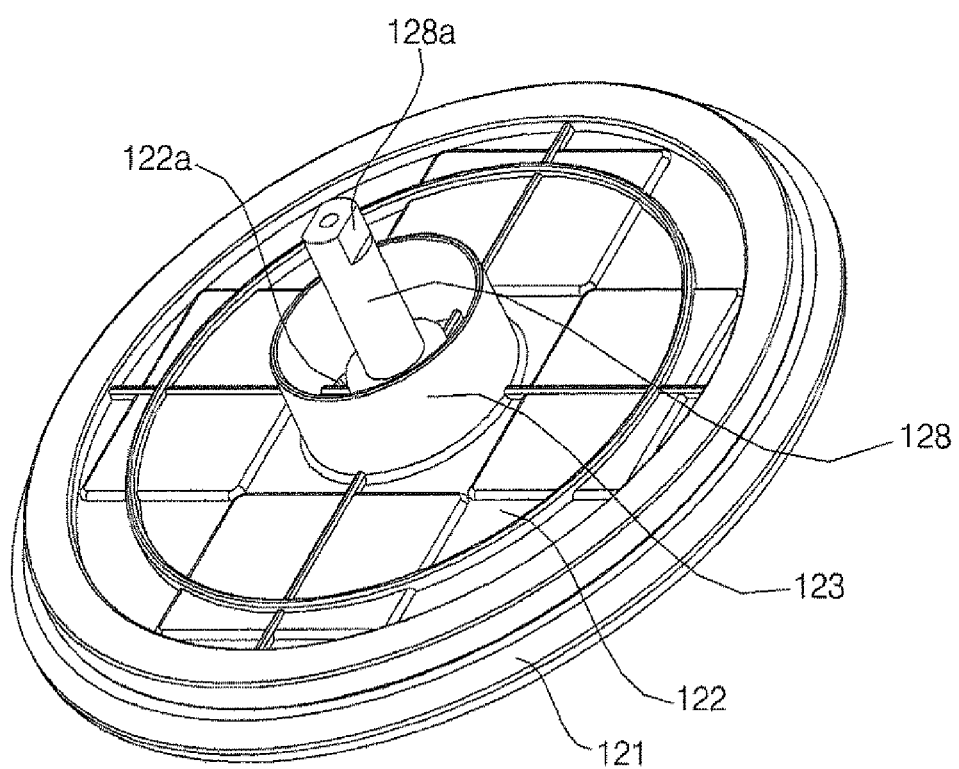
FIG. 14 is a perspective view illustrating a portion of a first cleaning module 120 in FIG. 1.

Referring to FIGS. 12 to 14, the first cleaning module 120 includes a left rotating plate 122, which fixes the mop unit 121 of the left spin mop 120a, and a right rotating plate 122, which fixes the mop unit 121 of the right spin mop 120b. The rotating plate 122 may be formed by a circular plate member. The mop unit 121 is fixed to the bottom surface of the rotating plate 122. A spin shaft 128 is fixed to the center portion of the rotating plate 122. A water supply hole 122a vertically penetrates the rotating plate 122. A plurality of water supply holes 122a may be arranged so as to be spaced apart from each other in the circumferential direction of the spin shaft 128. The water supply hole 122a is located in the center portion of the rotating plate 122. The water supply hole 122a is located so as to avoid the spin shaft 128.

The first cleaning module 120 includes a water supply reservoir 123, which is disposed at the upper side of the rotating plate 122 so as to accommodate water therein. The water supply reservoir 123 allows the water supplied to the upper side of the rotating plate 122 to be collected in the center portion of the upper side of the rotating plate 122 until the water passes through the water supply hole 122a. The water supply reservoir 123 protrudes upwards from the top surface of the rotating plate 122 and extends in the peripheral direction of the spin shaft 128. The water supply reservoir 123 may be formed by a ring-shaped rib. The water supply hole 122a is located in the inner lower surface of the water supply reservoir 123. The water supply reservoir 123 is spaced apart from the spin shaft 128.

The first cleaning module 120 includes a motor 124, which provides drive force for rotating the left spin mop 120a and the right spin mop 120b. The first cleaning module 120 includes a left motor 124, which provides power required for rotating the left spin shaft 128, and a right motor 124, which provides power required for rotating the right spin shaft 128.

The first cleaning module 120 includes a tilting frame 125, which allows the inclination angle Ag2 to be changed depending on the state of the floor. The tilting frame 125 may perform a suspension function for the left spin mop 120a and the right spin mop 120b (a function of supporting the weight and alleviating vertical vibration).

Referring to FIGS. 12 and 13, the first cleaning module 120 includes a left tilting frame 125, which supports the left spin shaft 128. The left tilting frame 125 is rotatable within a predetermined range about a left tilting rotary shaft 126. The first cleaning module 120 includes a right tilting frame 125, which supports the right spin shaft 128. The right tilting frame 125 is rotatable within a predetermined range about a right tilting rotary shaft 126. The tilting frame 125 may rotatably support the spin shaft 128 using a bearing. For example, when the left spin mop 120a is brought into contact with a recessed portion in the floor, the inclination angle Ag2 of the left spin mop 120a may be increased within a predetermined range by the left tilting frame 125. When the right spin mop 120b is brought into contact with a recessed portion in the floor, the inclination angle Ag2 of the right spin mop 120b may be increased within a predetermined range by the right tilting frame 125.

The tilting frame 125 includes a frame base 125a defining the bottom surface thereof. The spin shaft 128 is disposed so as to vertically penetrate the frame base 125a. The tilting frame 125 includes a gear casing 125b, which accommodates a driving transmission unit 127 therein. The gear casing 125b is fixed to the upper side of the frame base 125a. The tilting frame 125 includes a water feeder 125c, which receives water from the water supply module 150. The water feeder 125c receives water from a supply pipe 156. The water feeder 125c has an opening formed in the upper side thereof, and the water discharged from the supply pipe 156 is introduced into the first cleaning module 120 through the upper opening in the water feeder 125c. The water feeder 125c forms a flow passage, which extends from the upper opening to the water supply reservoir 123. The water feeder 125c is disposed on the upper side of the frame base 125a. The tilting frame 125 includes a first elastic member support portion 125d, which supports one end of the elastic member 129. A second elastic member support portion 13b, which is disposed at the base 13, supports the opposite end of the elastic member 129. The first elastic member support portion 125d supports the lower end of the elastic member 129. The second elastic member support portion 13b supports the upper end of the elastic member 129.

Figure 10:
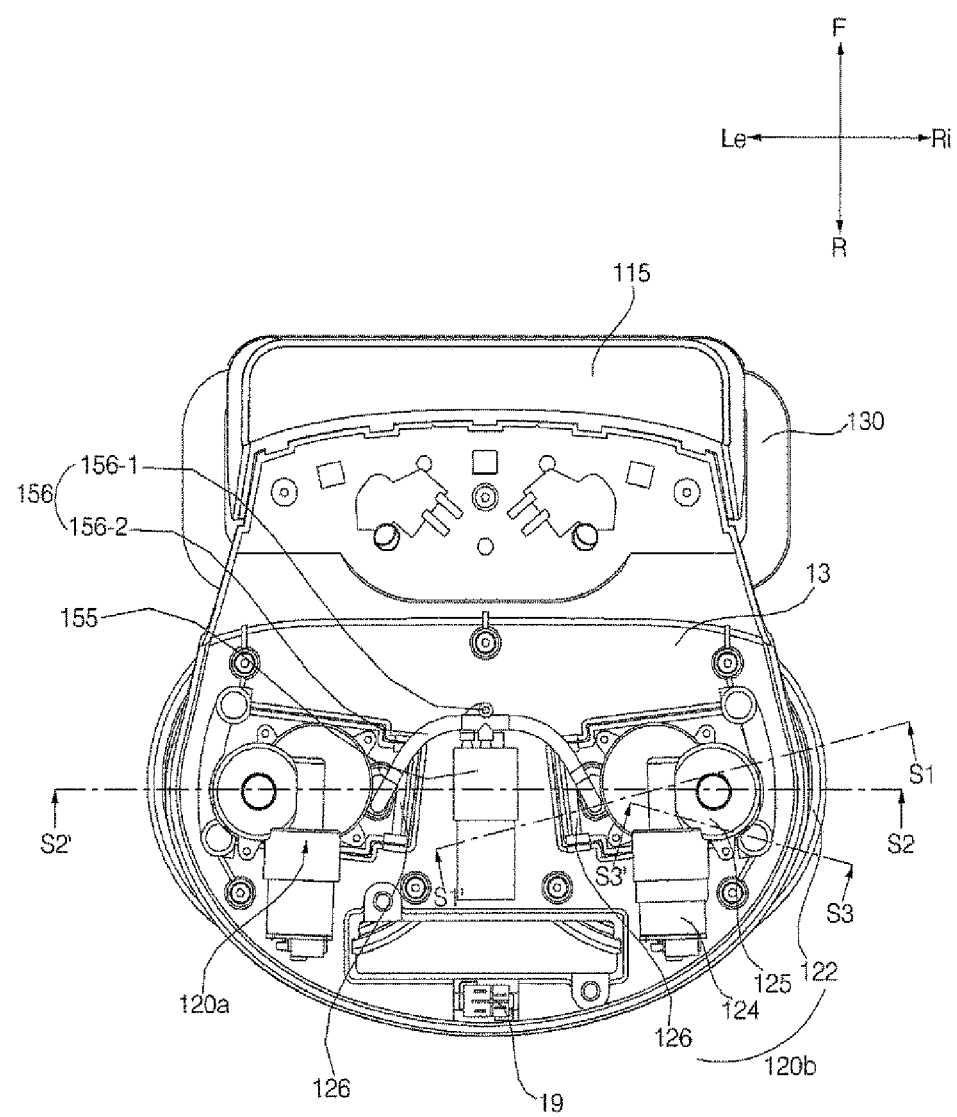
FIG. 10 is a top view of the cleaner 100 in FIG. 9.

The first cleaning module 120 includes a tilting rotary shaft 126, which is a rotating shaft of the tilting frame 125. The first cleaning module 120 includes a left tilting rotary shaft 126, which extends in the direction perpendicular to the inclined direction of the bottom surface of the left spin mop 120a. The first cleaning module 120 includes a right tilting rotary shaft 126, which extends in the direction perpendicular to the inclined direction of the bottom surface of the right spin mop 120b. The tilting rotary shaft 126 may be disposed on an imaginary horizontal plane. Referring to FIG. 10, the left tilting rotary shaft 126 extends from the right-front portion to the left-rear portion, and the right tilting rotary shaft 126 extends from the left-front portion to the right-rear portion.

The first cleaning module 120 includes the driving transmission unit 127, which transmits the torque of the motor 124 to the spin shaft 128. The driving transmission unit 127 may include a plurality of gears and/or a belt, for example. Referring to FIG. 12, the driving transmission unit 127 includes a first gear 127a fixed to a rotating shaft of the motor 124. The first gear 127a may be a worm gear. The driving transmission unit 127 may include a second gear 127b, which is engaged and rotated with the first gear 127a. The driving transmission unit 127 may include a third gear 127c, which is engaged and rotated with the second gear 127b. The third gear 127c is fixed to the spin shaft 128, and thus the spin shaft 128 is also rotated along with the rotation of the third gear 127c. The second gear 127b may include a first gear portion 127b1, which forms gear teeth that mesh with gear teeth of the first gear 127a, and a second gear portion 127b2, which forms gear teeth that mesh with gear teeth of the third gear 127c. The first gear portion 127b1 may have a larger diameter than the second gear portion 127b2. A reduction gear ratio of the rotational speed may be adjusted by making the diameter of the first gear portion 127b1 and the diameter of the second gear portion 127b2 different from each other.

The first cleaning module 120 includes the spin shaft 128, which is fixed to the rotating plate 122 and transmits the torque of the motor 124 to the rotating plate 122. The spin shaft 128 is disposed on the upper center of the rotating plate 122. The spin shaft 128 is fixed to the rotation center Osa or Osb of the rotating plate 122. The spin shaft 128 includes a gear-fixing portion 128a for fixing the gear 127c. The gear-fixing portion 128a is disposed on the upper end of the spin shaft 128.

The first cleaning module 120 includes a left spin shaft 128 fixed to the left rotating plate 122 to rotate the left rotating plate 122, and a right spin shaft 128 fixed to the right rotating plate 122 to rotate the right rotating plate 122.

The spin shaft 128 extends perpendicular to the rotating plate 122. The left spin shaft 128 is disposed perpendicular to the bottom surface of the left spin mop 120a, and the right spin shaft 128 is disposed perpendicular to the bottom surface of the right spin mop 120b. Since the bottom surface of the left spin mop 120a and the bottom surface of the right spin mop 120b are inclined relative to the horizontal plane, the left spin shaft 128 and the right spin shaft 128 are tilted relative to the vertical axis. The upper end of the left spin shaft 128 is tilted to the left-front side relative to the lower end. The upper end of the right spin shaft 128 is tilted to the right-front side relative to the lower end. The tilting angle of the left spin shaft 128 relative to the vertical axis may be changed depending on the rotation of the tilting frame 125 about the tilting rotary shaft 126. The tilting angle of the right spin shaft 128 relative to the vertical axis may be changed depending on the rotation of the tilting frame 125 about the tilting rotary shaft 126.

The first cleaning module 120 includes the elastic member 129, which applies elastic force to the tilting frame 125. The elastic member 129 stretches when the tilting frame 125 is rotated downwards, and shrinks when the tilting frame 125 is rotated upwards. The elastic member 129 enables shock-absorbing (elastic) operation of the tilting frame 125. The left elastic member 129 may be disposed on the left side of the left tilting frame 125. The right elastic member 129 may be disposed on the right side of the right tilting frame.

The base 13 has therein an opening, in which the tilting frame 125 is disposed. The tilting frame 125 is connected to the base 13 via the tilting rotary shaft 126. The tilting rotary shaft 126 is rotatably fixed to the base 13. The base 13 includes a limit for limiting the rotation range of the tilting frame 125. The base 13 includes an upper-end limit 13a for limiting the upward-rotation range of the tilting frame 125. The left upper-end limit 13a may be disposed on the left side of the left tilting frame 125 so as to be brought into contact with the upper surface of the left tilting frame 125. The right upper-end limit 13a may be disposed on the right side of the right tilting frame 125 so as to be brought into contact with the upper surface of the right tilting frame 125. The base 13 includes a lower-end limit (not shown) for limiting the downward-rotation range of the tilting frame 125. The lower-end limit is configured to be brought into contact with the lower surface of the tilting frame 125 or the lower surface of the motor 124 when the tilting frame 125 is maximally rotated in the downward direction.

Figure 11:
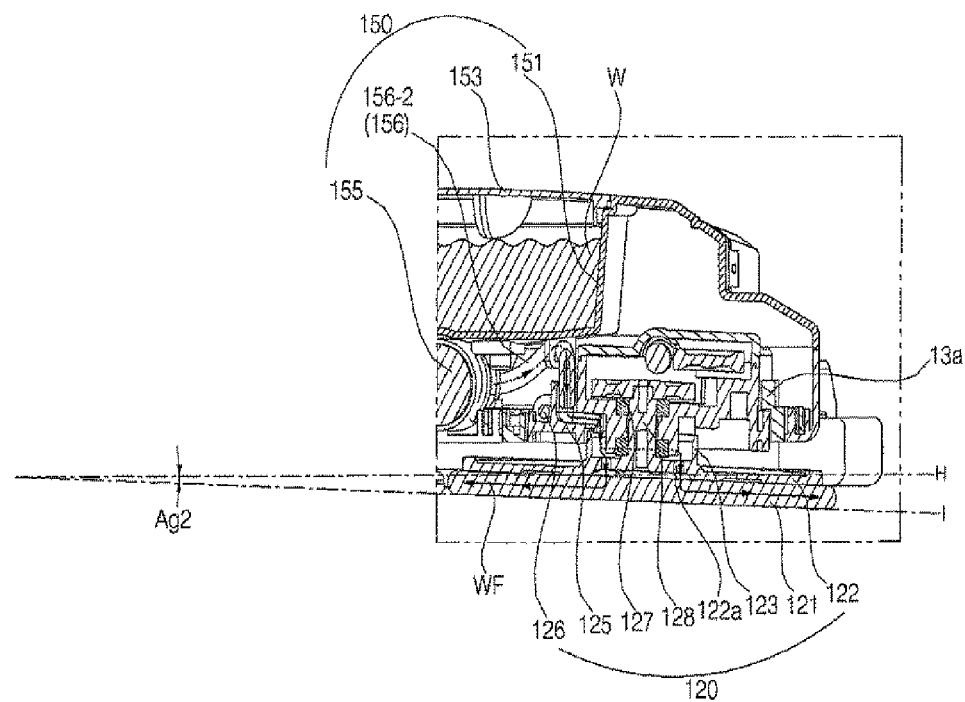
FIG. 11 is a vertical cross-sectional view of the cleaner 100 taken along line S1-S1' in FIGS. 5 and 10.

Referring to FIGS. 5, 7, 8, 9, 10 and 11, the water supply module 150 supplies water to the first cleaning module 120. In FIG. 11, the water W filling the water tank 151 and the water flow direction WF are illustrated. In FIGS. 5 and 7, the center of gravity Mw of the water tank 151 is illustrated.

The center of gravity Mw of the water tank 151 is the center of gravity Mw of the water tank 151 and water W in the state in which the water tank 151 is filled with water W. The center of gravity Mw of the water tank 151 is located behind the rotation center Osa of the bottom surface of the left spin mop 120a and the rotation center Osb of the bottom surface of the right spin mop 120b. The center of gravity Mw of the water tank 151 is located behind the lowest point Pla on the bottom surface of the left spin mop 120a and the lowest point Plb on the bottom surface of the right spin mop 120b. Because water W has a relatively high specific gravity, it is possible to further increase the ratio of the amount of load that is transmitted to the first cleaning module 120 to the amount of load that is transmitted to the second cleaning module 130.

The water supply module 150 includes a pump 155 for applying pressure to the water W inside the water tank 151 so as to move the water to the first cleaning module 120. The water supply module 150 includes the supply pipe 156, which guides the movement of the water W from the water tank 151 to the first cleaning module 120. The supply pipe 156 includes a first supply pipe 156-1, which guides the movement of the water W from the water tank 151 to the pump 155, and a second supply pipe 156-2, which guides the movement of the water W from the pump 155 to the first cleaning module 120. The second supply pipe 156-2 includes a left branch pipe 156-2a for guiding the movement of the water W to the left spin mop 120a, and a right branch pipe 156-2b for guiding the movement of the water W to the right spin mop 120b.

A description related to the water flow direction WF will be made below with reference to FIG. 11. When the pump 155 is driven, the water inside the water tank 151 sequentially passes through the first supply pipe 156-1 and the second supply pipe 156-2 and is introduced into the water feeder 125c of the first cleaning module 120. The water introduced into the water feeder 125c passes through the tilting frame 125 and is introduced into the water supply reservoir 123. The water introduced into the water supply reservoir 123 passes through the water supply hole 122a and is introduced into the center portion of the mop unit 121. The water introduced into the center portion of the mop unit 121 moves to the edge of the mop unit 121 due to centrifugal force generated by the rotation of the mop unit 121.

Figure 8:
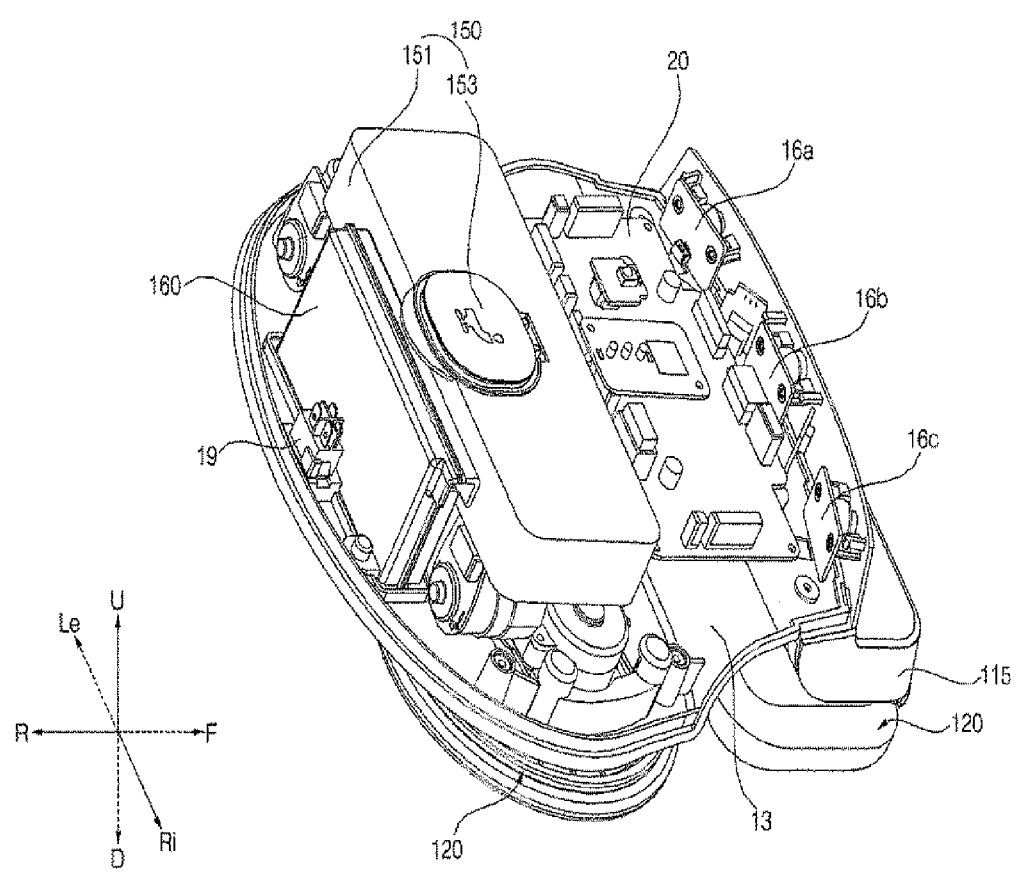
FIG. 8 is a perspective view illustrating the state in which a case 11 is removed from the cleaner 100 in FIG. 1.
Figure 9:
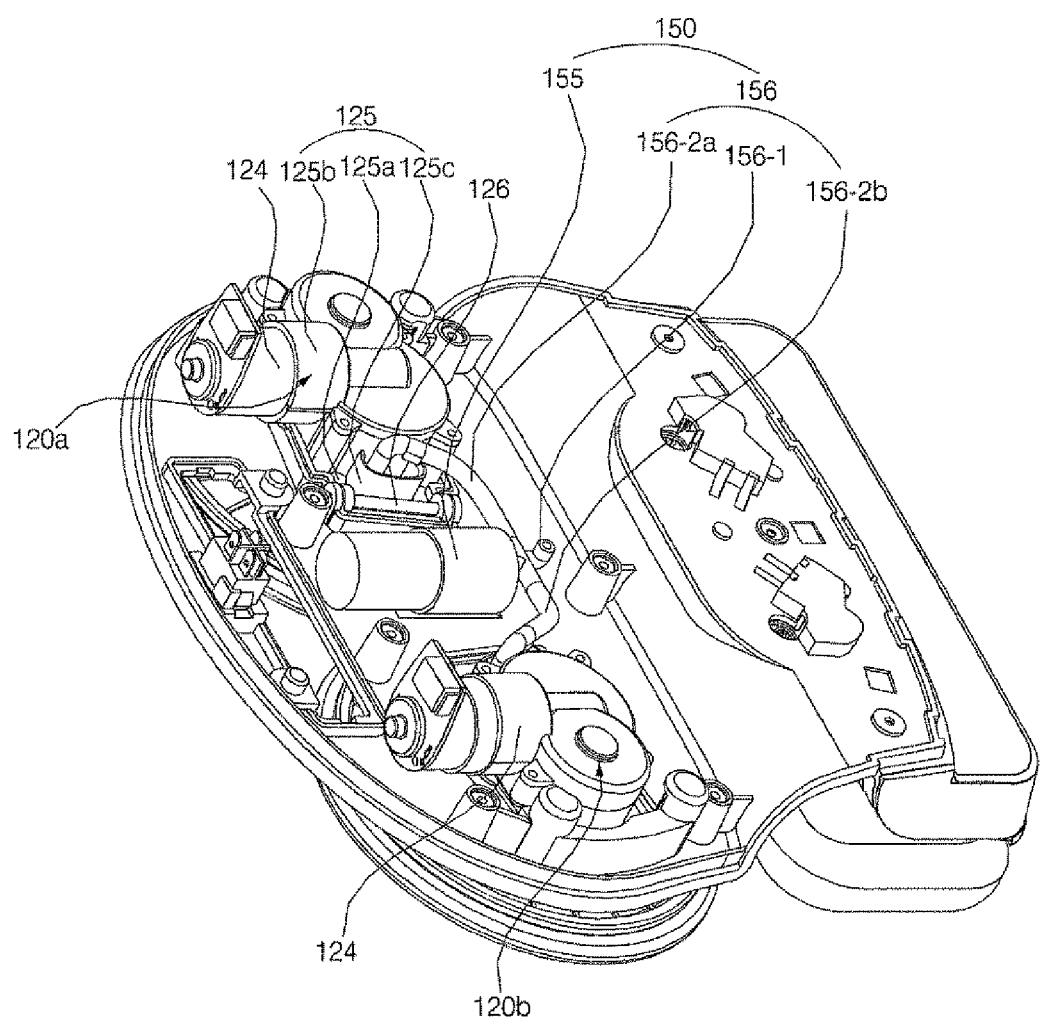
FIG. 9 is a perspective view illustrating the state in which a water tank 151, a water tank opening/closing unit 153 and a battery 160 are removed from the cleaner 100 in FIG. 8.

Referring to FIGS. 5, 7 and 8, the battery 160 supplies power to the cleaner 100. In FIGS. 5 and 7, the center of gravity Mb of the battery 160 is illustrated.

The center of gravity Mb of the battery 160 is located behind the rotation center Osa of the bottom surface of the left spin mop 120a and the rotation center Osb of the bottom surface of the right spin mop 120b. The center of gravity Mb of the battery 160 is located behind the lowest point Pla of the bottom surface of the left spin mop 120a and the lowest point Plb of the bottom surface of the right spin mop 120b. Because the battery 160 has a relatively high specific gravity, it is possible to further increase the ratio of the size of the load that is transmitted to the first cleaning module 120 to the size of the load that is transmitted to the second cleaning module 130.

What is claimed is:

1. A cleaner comprising:
a first cleaning module comprising a left spin mop and a right spin mop configured to come into contact with a floor while rotating in a clockwise direction or in a counterclockwise direction;
a second cleaning module configured to come into contact with the floor in front of the first cleaning module; and
a body supported by the first cleaning module and the second cleaning module,
wherein a bottom surface of the left spin mop has a downward incline in a left-forward direction, and a bottom surface of the right spin mop has a downward incline in a right-forward direction,
wherein the bottom surface of the left spin mop has a lowest point located at a left-front portion thereof, and
the bottom surface of the right spin mop has a lowest point located at a right-front portion thereof.

2. The cleaner according to claim 1, wherein the body moves by rotation motion of the first cleaning module without a separate driving wheel.

3. The cleaner according to claim 1, wherein the second cleaning module is configured to slide in contact with the floor along with movement of the body.

4. The cleaner according to claim 1, further comprising:
a water supply module configured to supply water to the first cleaning module,
wherein the first cleaning module is configured to perform mopping while rotating, and
the second cleaning module is configured to perform dry mopping.

5. The cleaner according to claim 1, further comprising:
a water tank storing water that is to be supplied to any one of the first cleaning module and the second cleaning module,
wherein a center of gravity of the water tank is located behind a rotation center of the bottom surface of the left spin mop and a rotation center of the bottom surface of the right spin mop.

6. The cleaner according to claim 1, further comprising:
a battery for supplying power,
wherein a center of gravity of the battery is located behind a rotation center of the bottom surface of the left spin mop and a rotation center of the bottom surface of the right spin mop.

7. The cleaner according to claim 1, further comprising:
a water tank storing water that is to be supplied to any one of the first cleaning module and the second cleaning module,
wherein the bottom surface of the left spin mop has a lowest point located at a left-front portion thereof,
the bottom surface of the right spin mop has a lowest point located at a right-front portion thereof, and
a center of gravity of the water tank is located behind the lowest point on the bottom surface of the left spin mop and the lowest point on the bottom surface of the right spin mop.

8. The cleaner according to claim 1, further comprising:
a battery for supplying power,
and
a center of gravity of the battery is located behind the lowest point on the bottom surface of the left spin mop and the lowest point on the bottom surface of the right spin mop.

9. The cleaner according to claim 1, wherein the body is formed such that a volume of a portion thereof of an upper side of the first cleaning module is larger than a volume of a portion thereof of an upper side of the second cleaning module.

10. The cleaner according to claim 1, wherein the first cleaning module comprises:
a left rotating plate fixing a mop unit of the left spin mop;
a left spin shaft fixed to the left rotating plate to rotate the left rotating plate;
a right rotating plate fixing a mop unit of the right spin mop; and
a right spin shaft fixed to the right rotating plate to rotate the right rotating plate.

11. The cleaner according to claim 10, wherein the first cleaning module comprises:
a left tilting rotary shaft extending in a direction perpendicular to an inclined direction of the bottom surface of the left spin mop;
a left tilting frame supporting the left spin shaft and to be rotatable within a predetermined range about the left tilting rotary shaft;
a right tilting rotary shaft extending in a direction perpendicular to an inclined direction of the bottom surface of the right spin mop; and
a right tilting frame supporting the right spin shaft and to be rotatable within a predetermined range about the right tilting rotary shaft.

12. The cleaner according to claim 10, wherein the left spin shaft is disposed such that an upper end of the left spin shaft is tilted to a left-front side relative to a lower end of the left spin shaft, and the right spin shaft is disposed such that an upper end of the right spin shaft is tilted to a right-front side relative to a lower end of the right spin shaft.

13. The cleaner according to claim 1, wherein, when viewed from a lower side, each of an inclined direction of the bottom surface of the left spin mop and an inclined direction of the bottom surface of the right spin mop forms an acute angle less than 45 degrees with respect to a leftward-and-rightward axis.

14. A cleaner comprising:
a first cleaning module comprising a left spin mop and a right spin mop configured to come into contact with a floor while rotating in a clockwise direction or in a counterclockwise direction;
a second cleaning module configured to come into contact with the floor in front of the first cleaning module; and
a body supported by the first cleaning module and the second cleaning module,
wherein a point on a bottom surface of the left spin mop that receives largest frictional force from the floor is located on a left-front side of a rotation center of the left spin mop, and
a point on a bottom surface of the right spin mop that receives largest frictional force from the floor is located on a right-front side of a rotation center of the right spin mop,
wherein the bottom surface of the left spin mop has a lowest point located at a left-front portion thereof, and the bottom surface of the right spin mop has a lowest point located at a right-front portion thereof.

* * * * *